United States Patent
Nikkanen et al.

(10) Patent No.: US 10,070,042 B2
(45) Date of Patent: Sep. 4, 2018

(54) METHOD AND SYSTEM OF SELF-CALIBRATION FOR PHASE DETECTION AUTOFOCUS

(71) Applicant: Intel Corporation, Santa Clara, CA (US)

(72) Inventors: Jarno Nikkanen, Kangasala (FI); Liron Ain-Kedem, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/384,081

(22) Filed: Dec. 19, 2016

(65) Prior Publication Data

US 2018/0176452 A1 Jun. 21, 2018

(51) Int. Cl.
*H04N 5/232* (2006.01)
*H04N 5/225* (2006.01)

(52) U.S. Cl.
CPC ....... *H04N 5/23212* (2013.01); *H04N 5/2254* (2013.01)

(58) Field of Classification Search
CPC .................................................. H04N 5/23212
USPC ........................................................ 348/349
See application file for complete search history.

(56) References Cited

U.S. PATENT DOCUMENTS

| | | |
|---|---|---|
| 8,885,090 B2 | 11/2014 | Oshima |
| 9,338,345 B2 | 5/2016 | Samurov et al. |
| 2004/0202461 A1 | 10/2004 | Nakahara |
| 2008/0158409 A1 | 7/2008 | Gotanda |
| 2011/0052169 A1 | 3/2011 | Arita et al. |
| 2011/0128432 A1* | 6/2011 | Shiohara ............ H04N 5/23212 348/333.02 |
| 2012/0300116 A1 | 11/2012 | Nakamoto |
| 2015/0365584 A1* | 12/2015 | Samurov ................ G03B 13/36 348/349 |

* cited by examiner

*Primary Examiner* — Joel Fosselman
(74) *Attorney, Agent, or Firm* — Green, Howard & Mughal LLP

(57) ABSTRACT

Techniques related to self-calibration for phase detection autofocus.

25 Claims, 13 Drawing Sheets

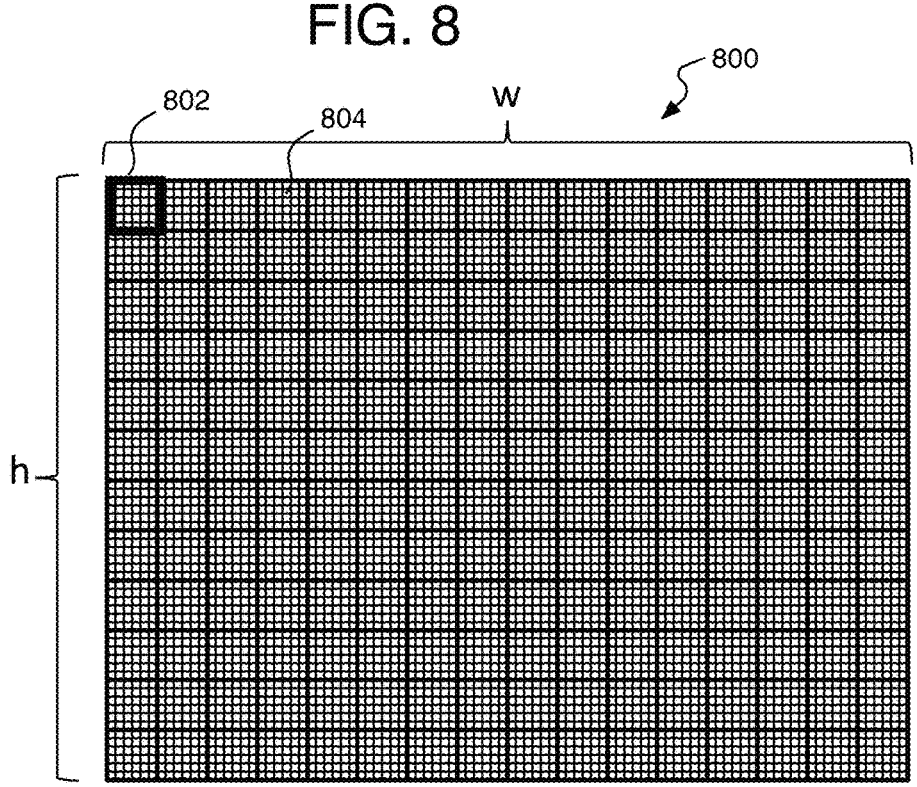

RECEIVE, AT AN IMAGING DEVICE, INITIAL PHASE DETECTION AUTOFOCUS (PDAF) CALIBRATION DATA WITH THE SAME VALUES TO BE PROVIDED TO MULTIPLE IMAGIN DEVICES 902

CAPTURE, BY THE IMAGING DEVICE, A PLURALITY OF IMAGES 904

GENERATE, BY THE IMAGING DEVICE, DEVICE-SPECIFIC PDAF CALIBRATION DATA COMPRISING REFINING PDAF CALIBRATION DATA BY USING THE PLURALITY OF IMAGES 906

PROVIDE THE DEVICE SPECIFIC PDAF CALIBRATION DATA TO BE USED TO OBTAIN, BY THE IMAGING DEVICE, IMAGE DATA OF MULTIPLE SUBSEQUENT IMAGES 908

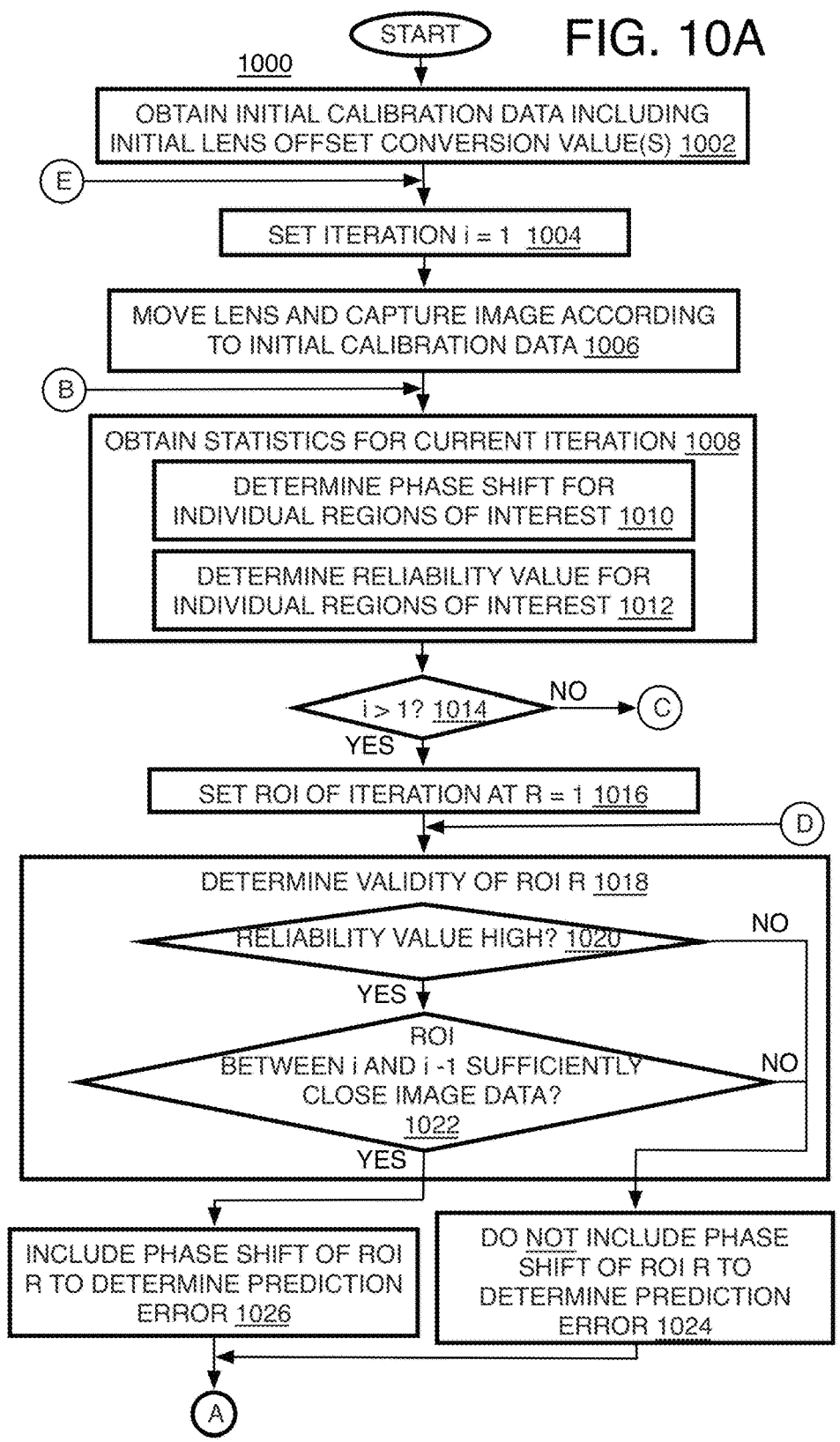

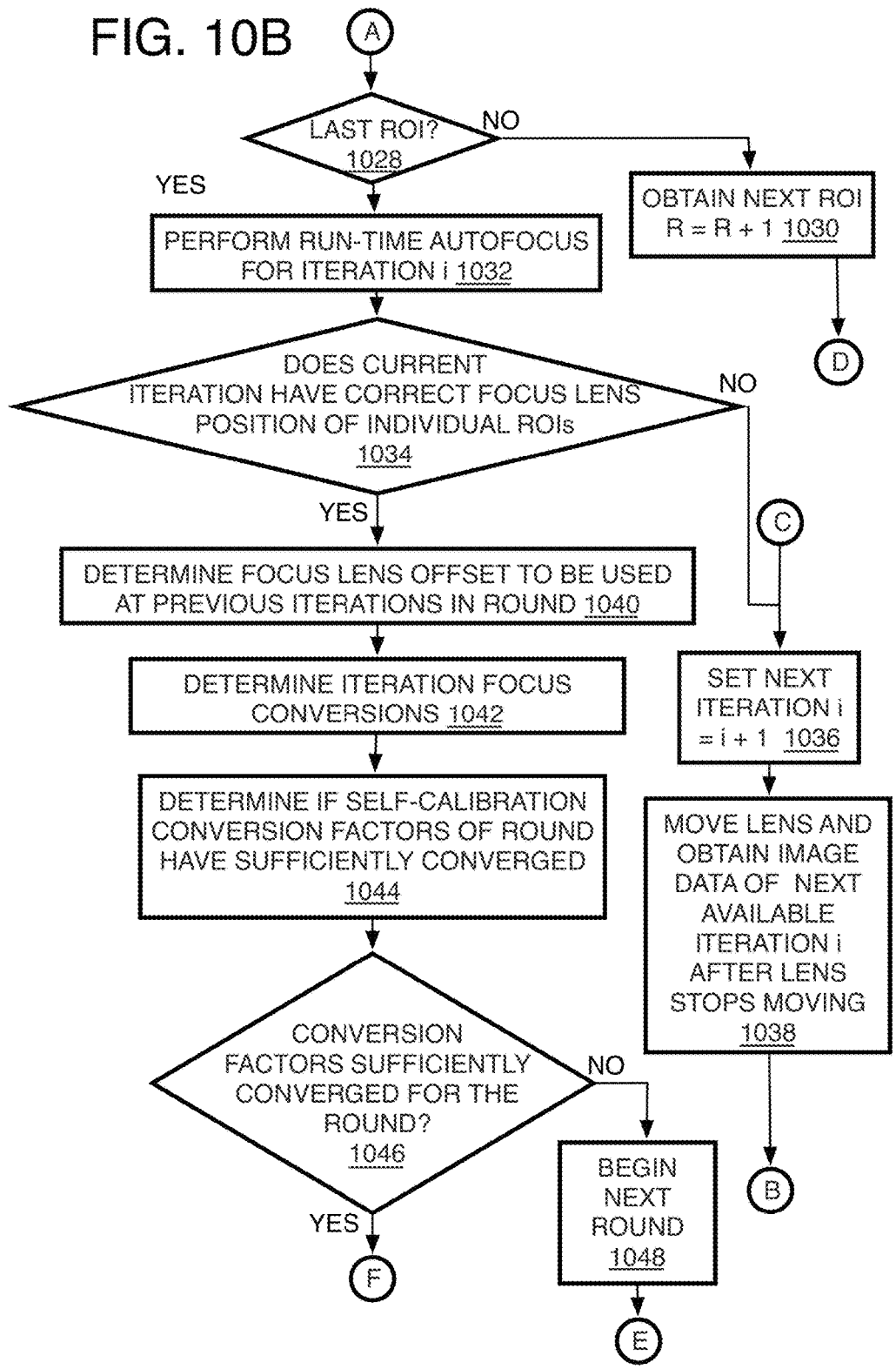

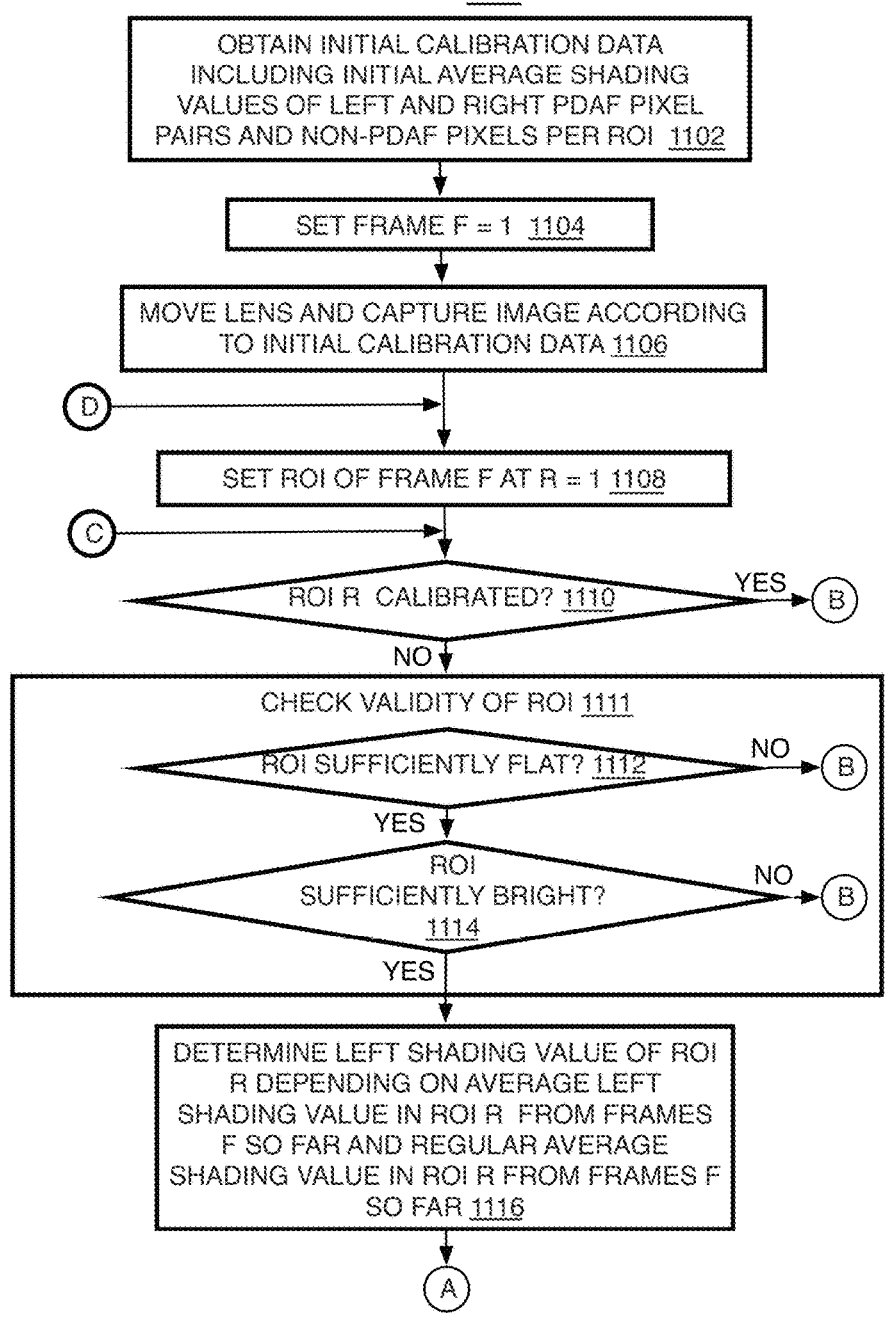

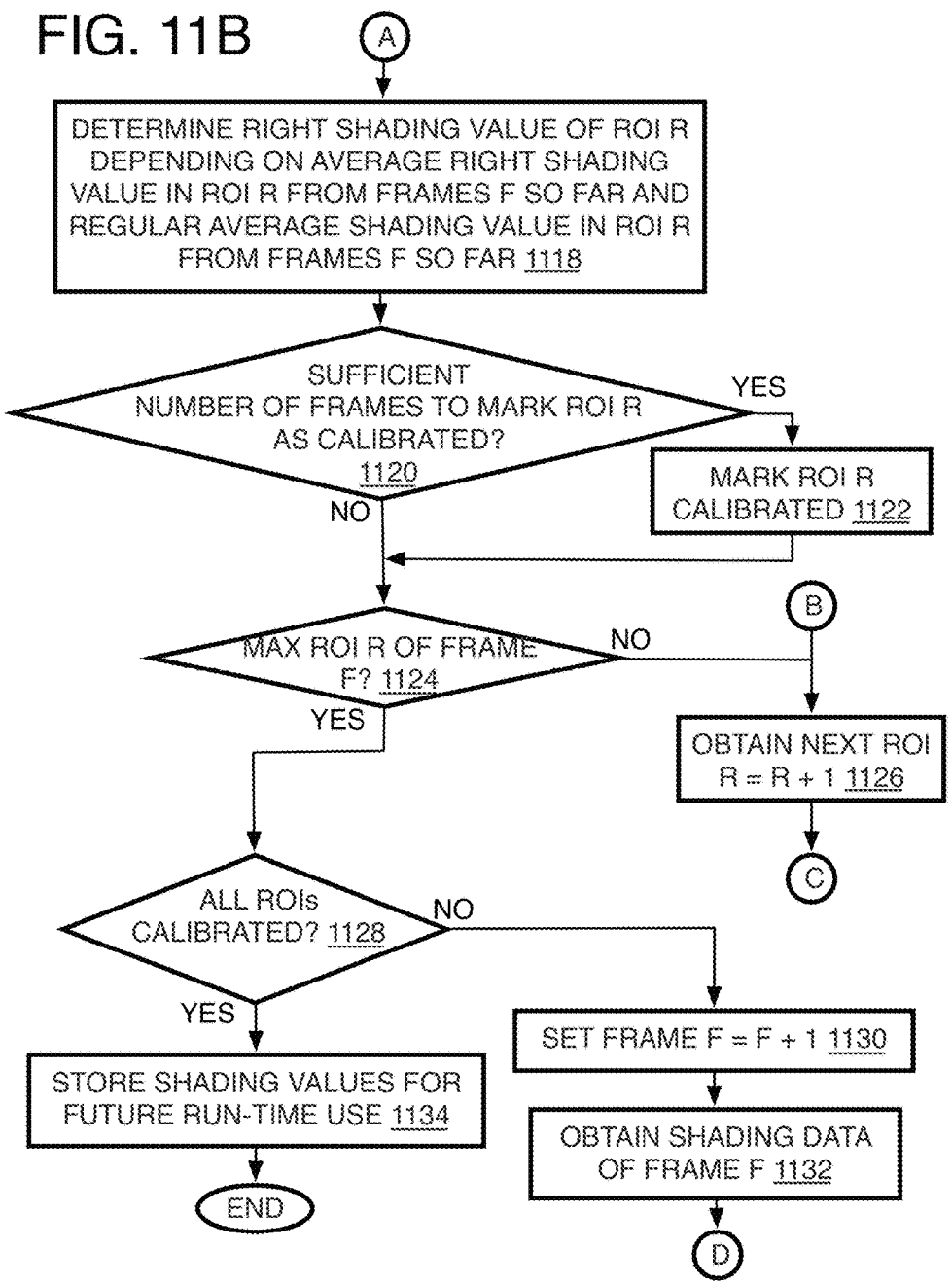

METHOD AND SYSTEM OF SELF-CALIBRATION FOR PHASE DETECTION AUTOFOCUS

BACKGROUND

In digital cameras, autofocus may be used to focus on an object of interest. Such digital cameras may be provided as stand alone devices or they may be integrated into a multipurpose device such as a smartphone or the like. In various implementations, digital cameras may use phase detection autofocus (PDAF also referred to as phase autofocus or phase based autofocus), contrast based autofocus, or both. Phase detection autofocus separates left and right light rays though the camera's lens to sense left and right images. The left and right images are compared, and the difference in image positions on the camera sensors can be used to determine a shift of a camera lens for autofocus. Contrast autofocus measures the luminance contrast over a number of lens positions until a maximum contrast is reached. A difference in intensity between adjacent pixels of the camera's sensor naturally increases with correct image focus so that a maximum contrast indicates the correct focus. Phase detection autofocus may be advantageous in some implementations because it is typically faster than contrast based autofocus. For example, phase detection autofocus may allow a digital camera to determine the correct direction and amount of lens position movement based on a single frame of captured information, which may increase focusing speed. Furthermore, phase autofocus may be advantageous because it limits or eliminates overshoot (e.g., the camera changing lens position past the position of focus to obtain the information needed to determine the position of focus as performed in contrast based autofocus). Such overshoots take time and can reduce quality in video capture.

Calibration steps are conventionally required at the production line in order to handle variations between camera module samples during mass production to achieve sufficient autofocus accuracy with all samples. This includes detecting phase shifts between pairs of left and right sensor pixels. The phase shifts are then used to determine spatial characterization or conversion values to convert the phase shifts to lens offsets which are the distances a lens must move to correct for a measured phase shift and bring an object in a scene to be captured into focus. Phase detection autofocus calibration also may include a characterization of spatial shading of the left and right sensor pixels so that corrections in shading can be computed later during a run-time to capture images.

During calibration of phase shift mapping into lens offset, the mapping is set independently for each camera or sample to attain sufficient accuracy. Likewise, a flat field image is captured per sample, and correction gains are calculated for left and right type pixel values independently for each sample. Use of such PDAF calibration at the production line, however, where each sample is handled separately results in significant delay and costs. Also, inaccuracies and/or mistakes can occur when the per sample calibration data is captured and stored. Thus, the PDAF production line calibration actually may add an error source that is difficult and costly to debug.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 8 is an illustrative diagram of an example grid of regions of interests used for image data statistics to be used to perform the self-calibration phase detection autofocus implementations herein;

FIG. 9 is a flow chart illustrating an example method of self-calibration for phase detection autofocus;

FIGS. 10A-10C is a flow chart illustrating an example detailed method of self-calibration for phase detection autofocus;

FIGS. 11A-11B is a flow chart illustrating another example detailed method of self-calibration for phase detection autofocus;

DETAILED DESCRIPTION

Figure 1:
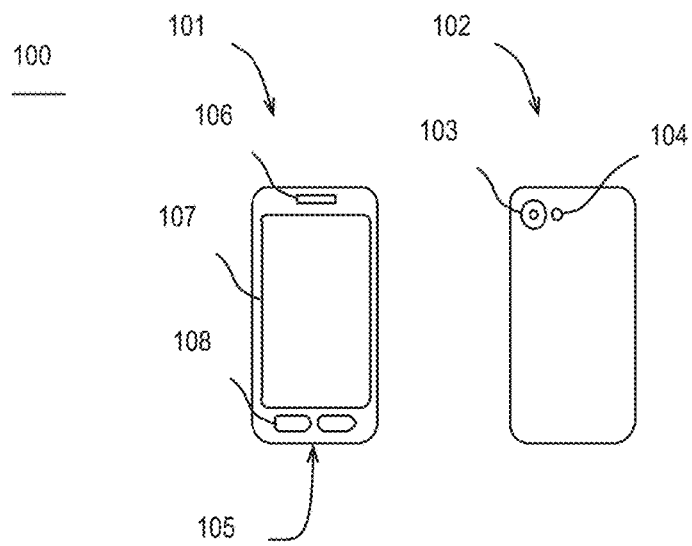
FIG. 1 is a schematic diagram of an example image capture device to perform the self-calibration phase detection autofocus implementations herein.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as image capture devices, digital cameras, smart phones, webcams, video game panels or consoles, set top boxes, tablets or laptops with one or more autofocus cameras, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Methods, devices, systems, and articles are described herein related to providing self-calibration for phase detection autofocus.

As described above, digital cameras (e.g., cameras or cameras integrated within devices such as smartphones or the like) may perform autofocus (AF) using phase detection autofocus (PDAF) or contrast based autofocus or both. Some hybrid systems include PDAF or both of these two autofocus methods in addition to other AF methods such as those AF methods that use time-of-flight based distance measurement components, or multi-camera stereo imaging based distance measurements. In some instances, a digital camera may use phase detection autofocus, which is advantageously faster and can eliminate overshoot. However, calibration for phase detection autofocus so far has required capturing and storing calibration data at a production line.

Particularly, a camera sensor may be divided into blocks or regions of interest (ROIs) of sensor pixels. The PDAF data is obtained either by using a PDAF metal shield (MS) system or a PDAF dual photodiode (DP) system, or some other way of separating light rays from opposite sides of an aperture. In a PDAF-MS system, a metal shield is placed above a single sensor pixel to divide the light beams hitting the sensor to obtain either a right image or a left image. These sensor pixels are provided in pairs to obtain both a right image on one sensor pixel and a left image on another sensor pixel. In a PDAF-DP system, two sensor photodiodes are provided under a single microlens to separately receive a right image and a left image. More details are provided below. Relevant here, the data from each ROI is used to determine PDAF calibration data. Also, each camera is conventionally tested at M calibration target distances and N lens positions for each target distance needed to be captured, and for each ROI at the production line. The mappings from phase shifts (the difference of image location between the right and left pixels) into lens offsets are determined for each camera and each ROI therein. That is, the phase shifts may be used to map (or provide a conversion) from the phase shift to lens offset. One or more of these ROI conversions are selected to move a single lens by a lens offset to then capture an image. These conversions, however, vary from one camera (or sample or module) to another.

Also, since shading is different from sample to sample, the shading of left and right pixels of an ROI is conventionally calibrated for a single camera by capturing a flat field image in a carefully controlled light environment for each sample. A flat field image is captured per sample, which enables sample specific spatial shading corrections of the left and right pixel signals. The shading values then may be stored in a camera or sample electrically erasable programmable read-only memory (EEPROM) or device file system, and this shading information may be used during run-time to correct the shading for a number of applications. The left and right shading values per ROI are kept in PDAF-statistics to reduce the shading difference between left and right type signals before calculation of similarity metrics (or difference metrics such as Sum-of-Absolute-Differences (SAD) for some processors) during run-time. In other words, the shading difference is determined to eliminate the shading difference from the left and right image differences (or difference metrics) so that it is clear which part of that difference is attributable to the phase shift and which part to the shading difference.

The labor and equipment to set up the phase shift mapping and shading calibration to obtain the precise mapping and shading measurements as well as to setup a specified light environment at the production line can be very time consuming and costly. Also, when the measurements are not performed correctly according to specifications for all camera samples, and/or the illumination and/or test chart setup change over time in such a way that the measurement results are changed, the production line calibration can insert another error source that is difficult and costly to debug. Certain personnel may need to come to a certain manufacturing facility, and/or the error may be difficult or expensive to detect as well as time consuming by inspection or expensive testing. Putting in place and running a process for a consumer to return cameras to repair this error compounds the expense even further.

The systems and methods disclosed herein may track phase-shift-to-lens-offset mapping errors over a number of iterations during the early operation of an image capture device. The error can be determined based on a prediction error that is a difference between the predicted in-focus lens position of a previous iteration that is used to position the lens, and the true in-focus lens position that is known after completing all of the auto focusing iterations. This prediction error can be determined from all the iterations that preceded the true in-focus lens position. When significant prediction errors exist, the error values may vary widely from iteration to iteration. The prediction error can result from erroneous phase-shift-to-lens-offset mapping, or it can result from some other reason, such as moving target object or poor signal to noise ratio in the PDAF signal. If the prediction errors across multiple autofocus iterations and multiple focusing rounds are consistent with certain change in the phase-shift-to-lens-offset mapping, then it is likely that the mapping does not fit well with the camera sample and should be updated. On the other hand, if the prediction errors are not consistent, then they are likely resulting from other error sources and not related to the mapping. It will be appreciated that herein phase shift and disparity are used interchangeably to refer to the difference value between a pair of left and right sensor pixels (or dual pixels or photodiodes of the PDAF-DP system).

To reduce or eliminate the need for sample-specific PDAF calibration at the production line, local mappings from ROI disparities to lens offsets may be updated and that is based on the distance from the actual lens position at individual iterations established using the earlier (golden) mapping to an optimal focus lens position. The lens offset to attain the optimal focus lens position at each iteration is the lens offset that should have occurred at each iteration. Once the correct lens offset is determined at each iteration, a new local conversion factor from phase shift (or disparity) to lens offset can be determined. When these local conversion values are the same or close to the same from iteration to iteration for a certain number of iterations, and the conversion value is not the one that is already stored for this camera sample (initially this is the conversion value for a "golden" reference camera that represents an average camera) and ROI, then this indicates that the conversion value for this camera and ROI needs to be updated. Once no such consistent need for conversion value change is detected for multiple iterations, then the self-calibration is considered complete. A single set of iterations, which may be referred to as a focusing round (or just round), still may not be sufficient. Thus, by one form, a number of rounds of iterations are tested where each round is a complete focus operation upon an object in a scene to be captured in an image. Once calibration is consistent for a number of rounds, the adjusted (or refined or replacement) conversion, or a look-up table of values using the conversion in a conversion function, is then stored for subsequent capture of images by an end user and the self-calibration is complete. The self-calibration operations may be performed when first using an image capture device (also referred to as an imaging device herein), but could otherwise be performed each or individual times the image capture device is turned on.

As to the shading statistics, the present methods calculate local ROI shading estimates for left and right images by using the shading from regular (non-PDAF) image data in addition to the left and right shading data from the PDAF sensors. The resulting shading data is stored for run-time PDAF calculations. The shading estimate may be accumulated and updated from a few frames in the early use of the device, and by averaging left or right shading values over the average of regular pixel shading values in individual ROIs, and average over all frames up to a current frame. Once sufficient shading estimates are established, the stored data does not need further updating. Consequently, in the beginning of a sequence of images such as for video recording and playback, the PDAF accuracy would be about the same as existing systems that do not support compensating for the effect of left versus right shading differences, and thereafter, the accuracy would improve immediately when the camera is capturing image content that is suitable for self-calibration.

One of the initial operations for both phase-shift conversion calibration and shading calibration is to use an average, ideal camera or sample such as a golden sample (also referred to as a golden module or golden module sample) based characterization, so the system can be fully functional as soon as it is used. By some alternatives, PDAF is combined with contrast AF to produce a hybrid AF (which may even include other autofocus techniques in addition to contrast), so that contrast AF may correct for the residual errors that remain after PDAF. Certain repetitive textures and low illumination level, for example, inherently require a fallback operation that uses contrast AF when the PDAF fails, or is not attempted at all, especially in the cases when metal shield based PDAF has a worse SNR than with other autofocus techniques. This may be reserved for the lower cost devices that are using PDAF. Other details are provided below.

FIG. 1 is an illustrative diagram of an example imaging device 100 for providing autofocus and performing PDAF self-calibration, arranged in accordance with at least some implementations of the present disclosure. As shown in FIG. 1, in an embodiment, imaging device 100 is a smartphone. As shown, imaging device 100 may include a front 101 and a back 102. In some examples, as shown, the back 102 of imaging device 100 may include an integrated camera 103 (e.g., including a lens, an aperture, and an imaging sensor) and a flash 104 (e.g., a flash or flash light such as a supercapacitor LED or the like). Also as shown, the front 101 of imaging device 100 may include a speaker 106, a display 107, and one or more buttons 108. Furthermore, imaging device 100 may include a microphone 105, which in the illustrated example is shown on the bottom of imaging device 100. Such devices may provide for a variety of uses of imaging device 100.

The described components of imaging device 100 may be incorporated in any suitable manner. For example, camera 103 and flash 104 may be incorporated on the front 101 of imaging device 100. In some examples, both a front and back camera and flash may be incorporated into imaging device 100. Furthermore, in some examples, display 107 may be a touch screen display such that a user may interact with imaging device 100 via commands initiated via display 107 such as tapping display 107 to indicate an object or region of interest for focusing. As discussed, in some examples, imaging device 100 may include each of the described components. In other examples, imaging device 100 may not include one or more of the described components. For example, imaging device 100 may not include speaker 106, display 107, and/or microphone 105. Furthermore, the discussed components may be incorporated into any form factor device such as the illustrated smartphone, a dedicated camera, an ultrabook, a laptop, a tablet, or any other device that has an autofocus camera. For example, dedicated cameras may include point and shoot cameras, interchangeable lens system cameras, mirror-less cameras, digital single-lens reflex (DSLR) cameras, and so on.

As discussed, camera 103 may include an image sensor. The image sensor may capture image data and phase autofocus data as discussed herein.

Figures 2A, 2B, 2C:
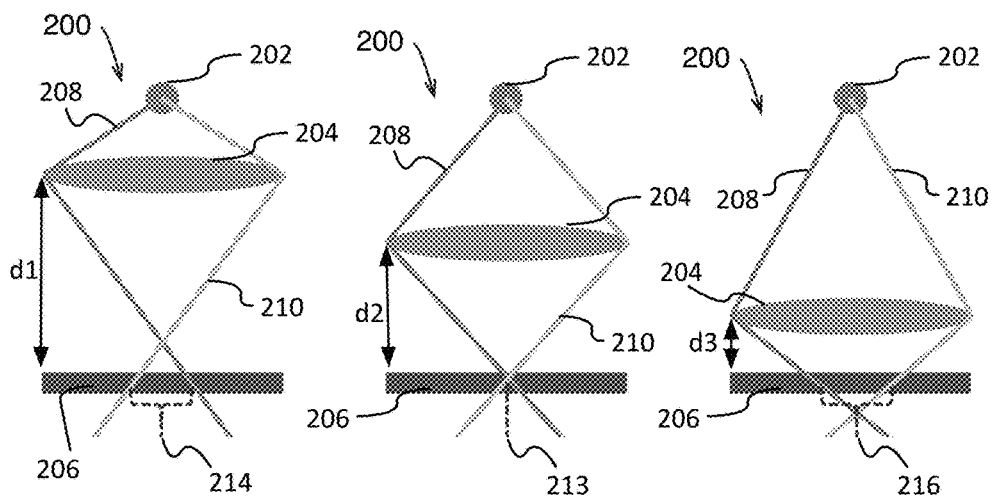
FIGS. 2A-2C are simplified schematic diagrams of an image capture device with a lens at different positions to assist with explaining phase detection autofocus.

Referring to FIGS. 2A-2C, autofocus involves automatically moving a lens closer or farther from a light sensor so that the far left and far right light rays reflecting from the object and through a lens hit at the same point (the focal point) on the sensor. To illustrate, an image capture device 200 is placed facing an object 202 that may be focused on by a lens 204 shown here in three different lens positions d1, d2, and d3, indicated as distances from a sensor 206. Furthermore, as shown, light rays 208 and 210 may reflect from object 202 and pass through lens or optics 204. The light may be divided into right and left sides by an aperture that is not shown here but is discussed below, and then onto sensor 206. As shown, the lens 204 is too close to the object 202 (too forward) in FIG. 2A causing the left and right light rays 208 and 210 to cross above the sensor 206 or in front of the sensor (referred to as a front focus), and so that the order from left to right of the light rays intersecting the sensor 206 is switched from a back focus (FIG. 2C) where the left ray 208 intersects the sensor 206 to the left of the right ray 210. The back focus has the lens 204 too far from the object 202 (too backward) so that the focal point is behind the sensor 206. FIG. 2B shows the correctly focused arrangement so that the left and right rays 208 and 210 intersect at the sensor 206.

Actually, the sensor 206 will sense a spectrum of intensity that can be graphed into an intensity profile with the most intense part at the center of the left or right light ray. If intensity profiles from separately recorded light rays are aligned or nearly aligned (where the peak of the profile is at the same location on the sensor), object 202 is in focus. In some examples, whether intensity profiles are aligned may be determined based on evaluating differences pixel pair by pixel pair inside a 2D area of sensor 200. The difference 214 or 216 between locations where the light rays, of intensity peaks, hit on the sensor is the phase shift needed to be converted into lens motion (in the direction perpendicular to the sensor) or lens offset to obtain proper focus. Depending on whether the light rays cross, a direction of lens position movement may be determined. Thereby, based on the distance 214 or 216 between the light rays at the sensor (or peaks of intensity profiles) and their orientations with respect to each other (e.g., which one is on the left), an autofocus phase shift and direction may be determined for imaging device 100. In some examples, the autofocus phase shift may be characterized as a phase difference or phase difference information. For example, the autofocus phase shift or phase difference may be an amount of shift (e.g., in pixels, with sub-pixel accuracy) that is needed to eliminate the difference between the left phase autofocus (PAF) and the right-PAF pixels. It will be understood that while left and right are used herein for convenience, the pixels could be one above the other or in a diagonal arrangement as described below. Also, it will be understood that the PDAF lens offset to compensate for a phase shift is a correction that will move the lens from out-of-focus position into in-focus position.

Figure 3:
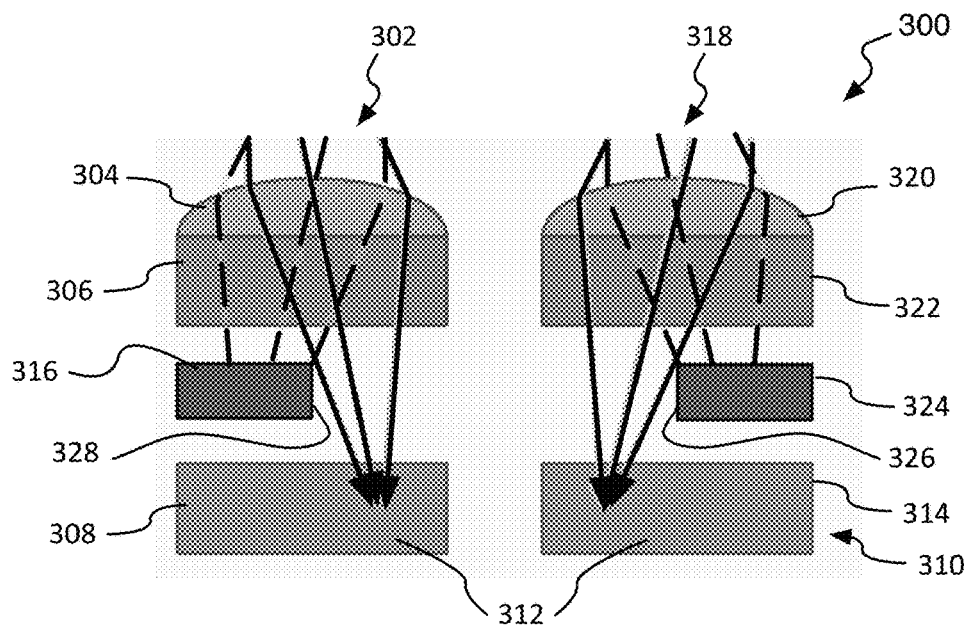
FIG. 3 is a schematic close-up view of sensor pixels on an example image capture device that can be used to perform the self-calibration phase detection autofocus implementations herein.
Figure 4:
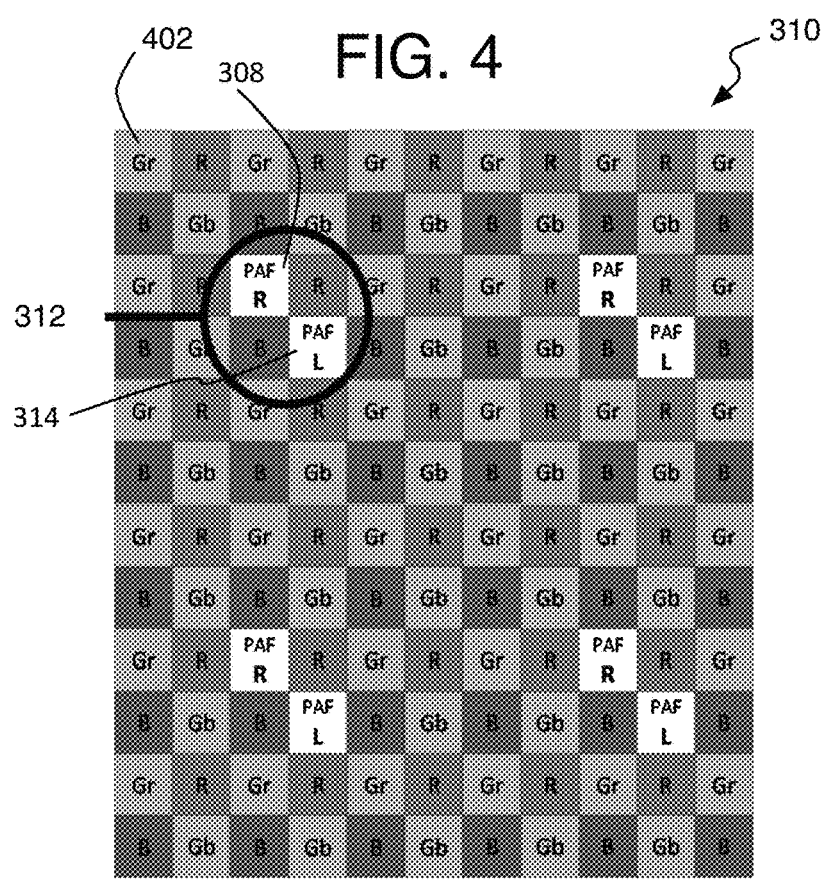
FIG. 4 is a schematic elevational diagram of an image sensor with a pixel layout and of the image capture device of FIG. 3.

Referring to FIGS. 3-4, an example image capture device 300 has a sensor 310 formed of sensor pixels 402 each to sense one color in a Bayer filter pattern for example blue B, red R, and greens Gr and Gb set diagonally in the Bayer quad. In this example, image capture device 300 uses a metal shield (MS) to divide reflected light into left and right light rays. Such an MS or PDAF-MS sensor 310 has spaced pairs 312 of phase autofocus detection (PDAF) sensor pixels 308 and 314 for example, interspersed among regular image (non-PDAF) sensor pixels 402. For example, sensor 310 may include any number of image sensor pixels 402 such as 8 megapixels, 10 megapixels, 12 megapixels, or the like and any desired number of pairs 312 of PDAF sensor pixels such as, for example, 300,000 pairs, 400,000 pairs, or 500,000 pairs 312 or the like. For example, pairs 312 of PDAF sensor pixels 308 or 314 may have a density sufficient to provide a desired resolution. Regular image (non-PDAF) sensor pixels 402 and pairs 312 of PDAF sensor pixels may include any suitable photo sensors such as charge-coupled devices, active sensor pixels, photodiodes, or any other devices that convert light into an electrical signal. It should be noted that the regular image sensor pixels 402 as well as the PDAF sensor pixels 308 and 314 for example also may be referred to as sensor pixels, or just pixels or just sensors depending on the context.

Furthermore, the pairs 312 of PDAF sensor pixels in a PDAF-MS system may be arranged on the sensor 310 in any suitable manner such that they may attain two phase autofocus images as discussed herein. For example, as shown on sensor 310, pairs 312 of PDAF sensor pixels may be arranged diagonally and adjacent to one another as shown with respect to PDAF sensor pixel 308 and PDAF sensor pixel 314. In other examples, PDAF sensor pixels 308 and 314 may be arranged horizontally and adjacent to one another or vertically and adjacent to one another. In the illustrated example, PDAF sensor pixels 308 and 314 are shown substantially next to each other. In other examples, PDAF sensor pixels 308 and 314 may be separated by a distance such that they are not next to each other and such that one or more regular image sensor pixels 402 are between them. Pairs 312 of PDAF sensor pixels may be arranged in any manner on sensor 310 such as spaced uniformly as shown on sensor 310, or in a varying pattern. Furthermore, pairs 312 of PDAF sensor pixels may be separated or spaced from each other by an offset.

Pairs 312 of PDAF sensor pixels 308 and 314 may record light rays separately such that one sensor pixel 308 of the pair may record light rays entering from a left side of an aperture and the other sensor pixel 314 of the pair may record light rays entering from a right side of the aperture. For instance, image capture device 300 is shown with a pixel structure 302 and 318 that respectively provide the pair 312 of PDAF sensor pixels 308 and 314 of sensor 310. Each pixel structure 302 and 318 has its own microlens or optical member 304 and 320 respectively above a color filter array (CFA) 306 or 322 respectively. The microlenses 304 and 320 are disposed near the sensor layer under the main moving lens (such as the lens 204 (FIG. 2)). The microlenses 304 and 320 above each pixel do not move and are positioned to direct light at a more perpendicular angle to the sensor 308 and 314 when light rays are received at a severe angle relative to the sensor plane. The color filter array 306 and 322 may divide color light rays according a desired pattern, such as the Bayer filter quad pattern. A metal shield 316 is placed between the sensor pixels 308 and 314 on one side of the metal shield and the lens 304 and 320 as well as the filters 306 and 322 on the other side of the metal shield. An aperture in the metal shield is formed by a left aperture edge 328 and a right aperture edge to extend over only an opposite portion of each sensor pixel 308 and 314. In other words, the metal shield 316 extends over the left side of the sensor pixel 308 and the right side of the sensor pixel 314.

With this configuration, the metal shield blocks the light rays (shown in dashed lines) from reaching the left side of the sensor 308, while permitting sensor pixel 308 to receive light rays (without dashes) through the aperture and past left edge 328 and to the right side of the sensor pixel 308. The opposite is true of the sensor pixel 314 where the metal shield only permits light rays to reach the left side of the sensor pixel 314. The sensor pixel 308 receiving light rays on its right side is considered the right sensor pixel, while the sensor pixel 314 receiving light rays on its left side is considered the left sensor pixel. Thus, it should be noted that the pair 312 of sensor pixels shown on sensor 310 are identified as R or L depending on whether the right or left side of the sensor pixel receives light to respectively provide image data of a left or right image, and does not necessarily coincide with a right or left location on the sensor 310 itself. Furthermore, use of the terms left and right herein are provided for clarity of presentation only. For example, the light rays may be oriented left and right as described or top and bottom or any other orientation that may provide for the separate images needed for phase autofocus.

Figure 5:
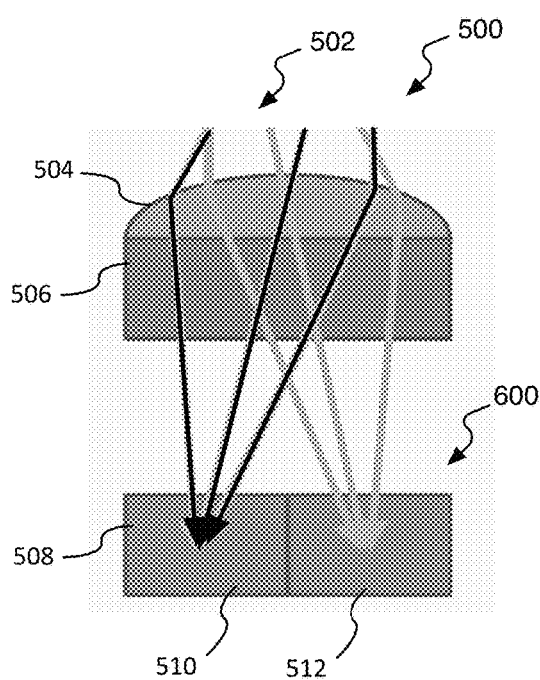
FIG. 5 is a schematic elevational close-up view of sensor pixels on another example image capture device that can be used to perform the self-calibration phase detection autofocus implementations herein.
Figure 6:
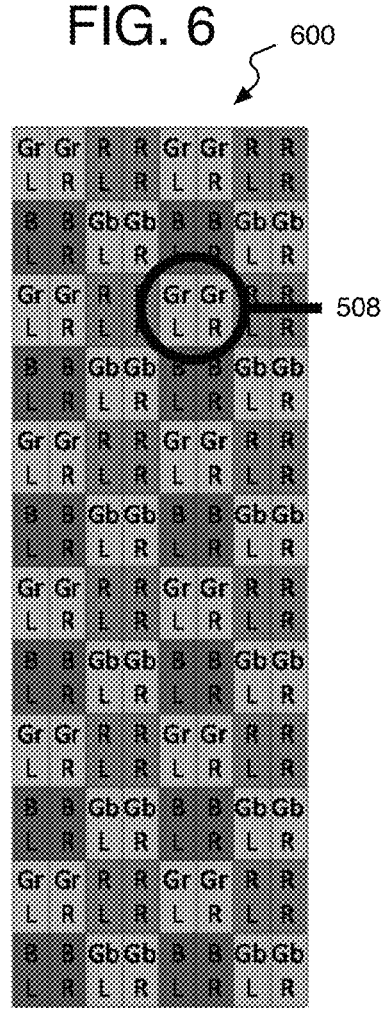
FIG. 6 is a schematic diagram of an image sensor with a pixel layout and of the image capture device of FIG. 5.

Referring to FIGS. 5-6, an alternative PDAF dual photo-diode (PD) system 500 has two adjacent photodiodes in the sensor area previously reserved for a single sensor pixel. As shown, an image capture device may have a sensor pixel structure with a microlens 504 and color filter array 506 as described above with imaging device 300, but that extends over a sensor pixel 508 formed of a pair of separate photodiodes including a right DP-sensor 510 and a left DP-sensor 512 which respectively receive left and right light rays to form left and right images. The sensor pixel 508 is merely one pixel of many on a sensor 600 shown here with Bayer quad pixels as well. In this case, however, each sensor pixel 508 is divided into two separate photodiodes 510 and 512 where each left DP-sensor forms a left image and each right DP-sensor forms a right image. These right and left DP sensors each may be referred to as a sensor pixel herein where the difference between the DP and MS systems are not relevant, and either system is being referred to.

As mentioned, the right and left PDAF sensor pixels of sensor 310 (or 600) may record the image data of the right and left light rays (after a change in lens position or the like) separately to generate intensity profiles, respectively. Although illustrated as a one-dimensional (1D) signals, intensity profiles may be two-dimensional (2D) signals provided over an area of sensor 310 (or 600). The separate recording of left and right light rays may provide for two phase autofocus images (e.g., a left image and a right image). For example, the left and right images may be based on a same image frame and/or image. In some examples, left and right images may be attained via PDAF sensor pixels 308 and 314 of sensor 310, or DP-sensors 510 and 512 of sensor 600. In some examples, no separate and full left and right images or image planes may be available, and instead a pixel stream from sensor 310 or 600 may be processed on-the-fly and may have only one or two lines of a frame at a time instead of the entire frame. Similarly, left and right images as described herein may include a stream of data associated with the left and right images (e.g. without full images being fully available at any time). As used herein, the term image includes fully formed images or image planes or partially formed images or image planes or data representing such fully or partially formed images or image planes. An image may be referred to herein as a picture or frame each associated with a different iteration depending on the context. Furthermore, as is discussed further herein, phase detection autofocus may be provided by shifting those images with respect to one another (e.g., horizontally as discussed herein or vertically) to determine a focus phase shift.

Figure 7:
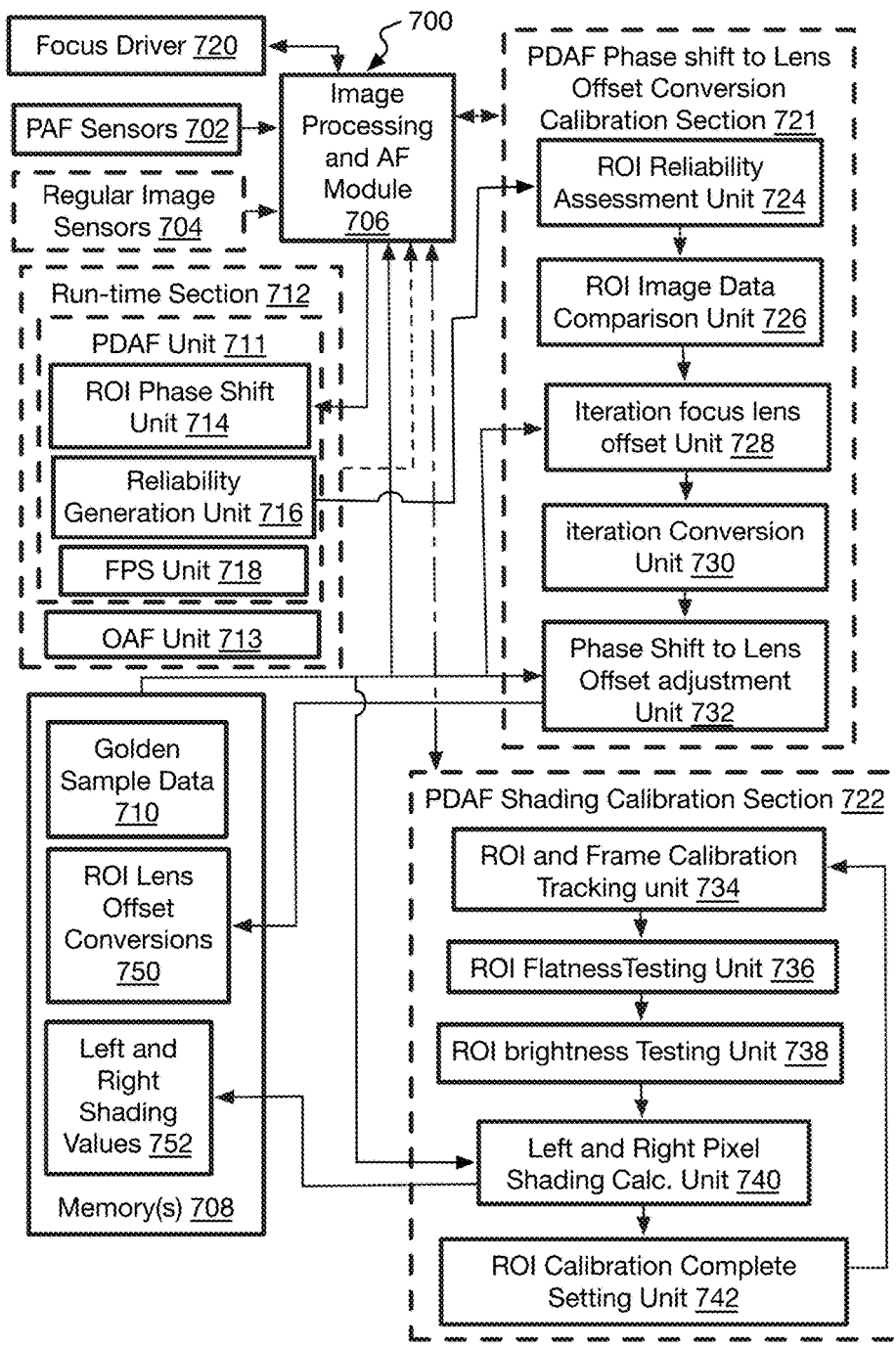
FIG. 7 is a schematic diagram of an imaging device using self-calibration for phase detection autofocus

Referring to FIG. 7, an example imaging device 700 is provided to implement the PDAF self-calibration methods described herein, and may be imaging device 100. Otherwise other than smartphones, imaging device 700 may be any image capture device that uses phase detection autofocus whether a stand-alone digital or digital single lens reflex (DSLR) autofocus cameras or digital still cameras (DSCs), web cams, and so forth, or device 700 may be, or may be on, a device with one or more autofocus cameras such as tablets, computers, video game box devices, and others. The components of the imaging device 700 shown may be, in various examples, implemented via one or more central processing unit(s), image processing units, and/or graphics processing unit(s) as is discussed further herein.

Device 700 may include image processing and autofocus (AF) module 706 that may obtain phase autofocus (PAF) sensor data from PAF sensors 702. For example, PAF sensor data may be provided via pairs of PDAF sensor pixels 312 or 508 of sensor 300 or 600 respectively, or as discussed herein. When the PAF sensors 702 are from a PDAF-MS system that has PDAF pairs spaced throughout a sensor, then regular image sensors 704 also may provide raw intensity and chroma image data separately from the PDAF sensor pixels (PAF sensors 702). Otherwise, in PDAF-DP system the PAF sensors provide all image data with the dual photodiodes per pixel as already described above.

PAF sensor data may include any suitable data such as an electrical signal indicating at least sensor intensities or the like. In some examples, PAF sensor data may be temporarily stored in a memory of imaging device 700. Image processing and autofocus module 706 may receive PAF sensor data from PAF sensors 702 or memory and may generate phase autofocus (PAF) images or portions of phase autofocus images in real-time and on-the-fly as discussed herein. For example, PAF images may include a first PAF image and a second PAF image such as left and right PAF images as discussed herein. In some examples, PAF images include grayscale images associated with intensities measured or attained via pairs of PDAF sensor pixels (which may include conversion from RGB to YUV data). As discussed, in some examples, no separate and full left and right images or image planes may be available, and instead a pixel stream from sensor 300 or 600 may be processed on-the-fly (e.g., image processing and autofocus module 706 may have only one or two lines of a frame at a time). Similarly, left and right images as described herein may include a stream of data associated with the left and right images (e.g. without full images being fully available at any time). For example, image processing and autofocus module 706 as implemented via an image signal processor (ISP) or a graphics processing unit (GPU) may receive PAF sensor data and provide PAF images (or portions thereof) on-the-fly and subsequent modules as described herein may process data on-the-fly without attaining full image data or the like. It will be understood, however, that this may refer to initial processing until region of interest (ROI) values that may include multiple rows of an image are needed as described in detail below.

Imaging device 700 also may have one or more memories 708 that are provided to a user from a manufacturing facility with golden sample data 710, and as described below, may hold roughly average PDAF calibration values considered to be the best available or ideal values. These may be stored in an EEPROM or device file system by some examples. The same golden sample values may be set on many devices mass produced by a manufacturer, and for PDAF calibration, may include roughly average phase-shift to lens offset conversion values per ROI (as described below) and that are based on a batch of samples of a certain size. The golden sample also may include shading statistics that are initial average shading values for left, right, and regular image sensor pixels per ROI as well.

Referring to FIG. 8, for efficiency and convenience, all of the sensor pixels on a sensor, and in turn the image it produces, referring to an entire statistics grid 800 that may be divided into a number of statistics grid cells 802 also referred to as ROIs or blocks for statistics and processing. An ROI is a group of pixels 804 with convenient sizes such as 250×250 pixels for a statistics grid with a size of 4000H×3000V pixels. The grid 800 may have a width w of 16 cells and height h of 12 cells but many variations exist. Many computations are performed on a per ROI basis, and this includes those for autofocus calibration.

The image processing and AF module may perform autofocus by using the stored golden sample data 710 at first, which is then used to operate the focus driver 720 and move a lens to a desired position to capture an image based, at least in part, on the phase shift to lens offset ROI golden conversions. Initial golden shading averages also may be used to improve the accuracy of difference metrics calculation between left and right type images. Once the image is captured, PDAF and regular image sensor data may be provide to a run-time section 712 to process the image data and provide autofocus for the next image.

Relevant here, the run-time section 712 may include components used to run the autofocus during operation of the device 700, and other run-time components not relevant here are not shown. As will be explained in detail below, the PDAF self-calibration is performed by using the device 700 and performing the PDAF self-calibration while the imaging device 700 performs a number of iterations so that self-calibration data can be aggregated over a number of images to obtain accurate values, and while a user can still obtain new images.

The run-time section 712 may include a PDAF unit 711 with an ROI phase shift unit 714 (also may be referred to as an accumulated phase difference module) that receives PAF images and ROIs (or equivalent information) from image processing and autofocus module 706 or memory. The ROI phase shift unit 714 may determine, for the individual ROIs, accumulated phase difference values (APDVs) that are a sum of the phase shifts in an ROI that can be used to form the reliability values described herein. As used herein, the term difference may refer to the difference between two phase autofocus pixels next to each other (e.g., pairs of autofocus pixels) or otherwise paired for a phase shift, in which one pixel is receiving light from the left (or top) side of an aperture and the other pixel is receiving light from the right (or bottom) side of the aperture. As discussed, left and right are used for the sake of clarity of presentation, but any opposing or opposite sides (e.g. top and bottom or the like) may be used. As discussed, the pair of phase autofocus pixels may be next to each other (e.g., adjacent or spatially close). In some PDAF-MS examples, the pair of phase autofocus pixels are diagonally next to each other (e.g., as Gr and Gb pixels are next to each other in the Bayer quad), and the pair of phase autofocus pixels may have some distance between them. Otherwise, the pair of phase autofocus pixels are formed as adjacent PDAF-DP photodiodes forming a whole pixel.

For the run-time determination of phase-shifts, by one form all pixels in an ROI may be used to calculate one phase shift estimate per one ROI. That is, difference metrics L vs R may be calculated for certain tentative phase shifts (sum of absolute differences SAD can be the difference metrics), e.g. tentative phase shift=[−5, +5], integer values only. Then, the sub-pixel accurate final phase shift is interpolated based on the tentative phase shift that gives the smallest difference between L and R, and the two tentative phase shifts on left and right side of that tentative phase shift.

Regarding the reliability value again, the accumulated phase differences may be used to determine a reliability value for individual ROIs by a reliability generation unit 716. The reliability value indicates the reliability or confidence of a selected phase shift for an ROI, and by one form, only those ROIs that have a high reliability value are used to determine the final focus phase shift by a focus phase shift (FPS) unit 718. Alternatively, contrast AF or other AF techniques may be used instead of PDAF when the phase shift is not reliable for an ROI that should be focused on a certain object in an image, and where that certain ROI in a certain position must be used (such as when an object is selected based on e.g. face detection, or manually selected by the user, and it cannot be changed). In general, the ROI selection algorithm is a separate part of AF, also using face detection, or then overridden by manual user selection. The focus phase shift is then provided to the image processing and AF module 706 to apply the PDAF calibration conversion to obtain a lens offset from at least one of the focus phase shifts, and then to drive the lens motor when PDAF is used for an iteration. The conversion is obtained from the golden sample data 710 at first but then the final or adjusted ROI lens offset calibration conversions 750 are provided when the PDAF self-calibration is complete as described below.

In some examples, depending on the reliability value, the image processing and AF module 706 may implement a hybrid autofocus system including phase detection autofocus and contrast based autofocus. For example, when the reliability value is high, the digital camera may use the focus phase shift to determine a lens position shift (e.g. based on motor units or the like), shift the lens position, and provide autofocus to a user based on phase autofocus. The reliability value may be compared to a heuristically determined threshold to determine whether it is sufficiently high. Such an autofocus may be fast and without overshoot. In examples when the reliability value is low, the digital camera may employ contrast based autofocus or a combination of phase autofocus and contrast based autofocus to determine a lens position shift, shift the lens position, and provide autofocus to the user. Contrast AF or any other AF technique may be implemented by the other AF (OAF) unit 713.

In some implementations, the reliability value may be generated by determining, for an ROI, the accumulated phase difference values associated with phase shifts for both the left and right phase autofocus images received via pairs of PDAF sensor pixels. Specifically, the reliability generation unit 716 obtains multiple candidate phase shifts by applying an algorithm to obtain the accumulated L vs R difference metrics values at multiple phases shifts between the left and right images formed by the left and right sensor pixels, say −5 to 5 or from −7 to 7, and this may be in sub-pixel accuracy. The accumulated difference values are then graphed. A curve fitting may be performed based on the accumulated difference values and phase shifts to generate an accumulated difference values fitted curve, and the reliability value may be generated based on the fitted curve (e.g., an analysis of the fitted curve). The curve analysis may include analyzing (1) the dynamic accumulated difference value range covered by the curve which indicates how big differences there are between different tentative phase shifts (if the differences are very small, then most likely the ROI does not have sufficient image details for reliable phase difference calculation), (2) the symmetry of the curve in which higher symmetry correlates with higher confidence on the resulting phase shift, (3) the sharpness of a main valley of the curve in which sharper valley correlates with higher confidence on the resulting phase shift, due to more distinct difference in difference metrics between correct and incorrect phase shift, (4) the number of sign changes in the derivative of the curve which indicates if multiple tentative phase shifts give equally good match between L and R, in which case the ROI contains repetitive texture that does not result in reliable phase shift, (5) brightness near at ROI being analyzed which gives an indication of the signal-to-noise ratio (SNR) and/or (6) signal-to-noise ratio (SNR) data indicative of a measure of signal-to-nose ratio in an ROI which generally indicates the level of undesirable interfering noise in the signals, or any desirable combination of these characteristics or others. Signal-to-noise ratio data, for example, may include an analog gain, lens shading correction (LSC) gain, a digital gain, an on-sensor gain, other gains, or signal levels, or the like. These factors may have various weights, and the measurements and weights of these factors may be combined in an algorithm to generate the reliability value. Other factors could be used as well. The reliability generation unit 716 may obtain the data to analyze these factors via the imaging processing module 706 or another component of imaging device 700. The details for generating the reliability or confidence value as well as more details for providing PDAF is provided by U.S. Pat. No. 9,338,345, which is cited in full above.

As mentioned, the image processing and AF module 706 may convert the focus phase shift (based on the reliability value) to a lens offset. This may be performed by first determining which one or more of the ROIs of all the ROIs on a full sensor are the important ROIs within a field of view (FOV) and that is to be used to set the lens offset for focusing. A single lens position is set for each focus distance in each image. Specifically, when a scene has objects at varying distances to the imaging device, such as a person in a foreground that is closer than a background in the scene, the autofocus algorithm may decide to focus on the person based on face detection and size of the face, or the fact that the person is the closest object and close to the center of the FOV. If there are multiple ROIs at varying distances to the person, and it seems those ROIs are equally important, then an average lens position among those ROIs could be used as the final lens position. Otherwise, a single most central ROI for an object in a scene may be used. Many different algorithms can be used for selecting the ROI to be used for the final focus phase shift. Otherwise, a traditional "center focus" may be used that uses the one ROI at the center of the image so that typically the user is required to aim the imaging device on the object to focus on, and recompose the image framing once focus has been locked. Again, many variations are available.

The computed or looked-up lens offset then may be provided to a focus driver 720 to move the lens to the desired position. The autofocus data indicating the lens offset may be provided in the form of a lens position shift, an updated lens position, and/or a number of lens motor units for driving the lens or the like. In one example, a number of lens motor units may be determined based on a focus phase shift found on a PDAF look up table implemented by the image processing and AF module 706. Otherwise, when contrast or other AF is running on an iteration, a lens position is provided in the AF data provided to the image processing and AF module 706. Once the image processing and AF module 706 provides the autofocus data to focus driver 720, the driver 720 may focus imaging device 700 by adjusting a lens position of imaging device 700.

While the imaging device 700 is running PDAF iterations, the run-time section 712 will generate reliability values for ROIs on each image captured and being processed when PDAF is being used, and that can be used for the PDAF self-calibration, while the image processing and AF module processes the raw image data and generates shading values for each ROI and for each image that also can be used for the PDAF self-calibration. For these purposes, the imaging device 700 may have a PDAF phase shift to lens offset conversion calibration section 721 (or just conversion calibration section) to perform the PDAF self-calibration to determine sample-specific phase shift to lens offset conversions, and a PDAF shading calibration section 722 to perform the PDAF self-calibration to determine sample-specific shading averages.

Particularly, the conversion calibration section 721 has an ROI reliability assessment unit 724 that determines whether a reliability of an ROI is sufficient to include a ROI in the self-calibration determination. An ROI image data comparison unit 726 compares the image data of a current frame to a previous frame (or iteration) to determine whether an ROI has a sufficiently similar image from iteration to iteration to be included in the self-calibration determination. An iteration focus lens offset unit 728 then may be used to determine the focus lens offset to move the lens from an iteration lens position to a focus lens position, and for individual ROIs. An iteration conversion unit 730 then generates local iteration conversions, and the local iteration conversions may be computed a number of times over a number of iterations and a number of focus rounds of iteration sets until the conversions sufficiently converge (and again for individual ROIs). The conversions of the rounds (and for individual ROIs) are then used by a phase shift to lens offset adjustment unit 732 to generate a final conversion value to be applied to phase shifts to compute the lens offsets during run-time. The final conversions per ROI are then stored in the ROI lens offset conversions 750 on memory 708 for use in focusing to capture subsequent images (this may be in the form of a look-up table based on a final conversion for each ROI). The details of operation of these components are provided below with process 1000.

The PDAF shading calibration section 722 may include an ROI and frame calibration tracking unit 734. The imaging device 700 runs through an initial number of frames in order to self-calibrate the shading for the device. The shading is tracked per ROI on each frame, and the data for the same ROI is aggregated from frame to frame until a sufficient number of contributing shading values are used to determine an average shading value for the ROI. The ROI and frame calibration tracking unit 734 tracks how many frames contributed to the ROIs and which ROIs are considered to be calibrated.

A ROI flatness testing unit 736 is provided to test the ROIs to be calibrated to determine if the color image data of the ROI is sufficiently flat for determining the shading because an average shading of the ROI is not a sufficiently true or accurate representation of a large variation of color in the ROI. This is true even when outliers are removed as described below. Specifically, the L and R pixels of a PDAF pixel pair are not in exactly the same location (especially in MS-PDAF), and a phase shift between L and R for an out-of-focus lens position can also introduce differences between L and R that is not due to shading. In order to concentrate on shading difference only, the ROI should have flat image contents to limit changes in color that add other non-shading differences.

A ROI brightness testing unit 738 is provided to test the ROIs to be calibrated to determine if the image data of the ROI is sufficiently bright for determining the shading. If the image is too dark, the image data from such an image capture is not sufficiently precise to determine shading statistics.

Once the data passes these tests, the PDAF shading calibration section 722 has a left and right pixel shading calculation unit 740 that computes the PDAF self-calibration shading average values of individual ROIs to be stored as shading statistics and that can be used to adjust shading for subsequently captured images. The left and right ROI shading averages are based on a proportion of the last left or right ROI shading average over the regular (image or non-PDAF sensor) pixel shading average for the ROI. The left and right shading averages are the shading average of the shading values of the left or right PDAF sensors, respectively, in the ROI. For the PDAF-MS system, the number of PDAF sensors involved may be significantly less than the regular sensors involved. In the PDAF-DP system, the number of PDAF sensor shading values involved may be about half that of the regular sensors. The averages also include an average of the respective relevant image data of all frames with a valid ROI up to and including the current frame and for the same ROI.

The PDAF shading calibration section 722 also has a ROI calibration complete setting unit 742 that determines when all ROIs (whatever frame contributed to the calibration of an ROI) has been calibrated. Thus, some ROIs may need more frames to be calibrated than others due to the ROI being skipped on some frames when not sufficiently bright or flat for example. Once all ROIs of a full sensor are calibrated, the left and right shading values 752 of each ROI are stored in memory 708 by one example. As mentioned, the stored shading values may be considered part of PDAF statistics, and may be provided to perform similarity computations (such as SAD), and may be used for lens shading correction during run-time and on subsequently captured images.

It will be appreciated that each component, unit, module, and section described herein may include those portions of code and/or hardware that provide the operations performed by that component, unit, module, and section regardless of where any of that code resides or what additional modules, units, and so forth any of that code is considered to be a part of.

It will also be understood that more components may be provided at imaging device 700 than that described here such as encoders, decoders, transceivers, antennas, and so forth, much of which are mentioned in implementations 1200, 1300, and/or 1400 described below.

Referring to FIG. 9, an example process 900 for self-calibration for phase detection autofocus is arranged in accordance with at least some implementations of the present disclosure. Process 900 may include one or more operations 902 to 908, numbered evenly. By way of non-limiting example, process 900 may form at least part of a self-calibration phase detection autofocus process for imaging device or system 100, 700, 1200, 1300, and/or 1400 as discussed herein and where relevant.

Process 900 may include "receive, at an imaging device, initial phase detection autofocus (PDAF) calibration data with the same values to be provided to multiple imaging devices" 902. This refers to the uploading of the same golden sample calibration values to multiple samples or cameras, which can be part of the production software/firmware of the device, prepared during development of that device, for example, and offline before mass production. Usually the golden sample calibration does not involve production line measurements, but may be stored in a camera parameter file that is part of the production software. So when the correct software/firmware is flashed into the device, the imaging device also gets all the non-sample-specific camera calibration and tuning data. By other forms, the initial data may be received from other memory, hardware, or software on the imaging device that is not considered to be part of the golden sample. By one form, the calibration data may include a conversion factor (or characteristic) that may be used to convert phase shift to lens offsets, and may be provided for each or individual ROI (or cell) of a sensor as described herein. Alternatively or additionally, the initial calibration data may include shading statistics, and where the golden sample shading statistics may include an initial left and right shading value for each or individual ROI. The statistics also may include a shading value for non-PDAF pixels in a PDAF-MS system for example versus a PDAF-DP system that already has left and right shading values for all pixels. By one form, the ROI shading values are averages of the relevant shading values at each of the pixels in the ROI. Thus, the left ROI shading value is an average of the left shading values of the pixels in the ROI, and likewise for the right and regular shading values. More details are provided elsewhere herein.

Process 900 may include "capture, by the imaging device, a plurality of images" 904, and particularly to perform the self-calibration over the plurality of images. By one form, this may be the first sequence of images that are captured when the imaging device is turned on the very first time and fully operational. By other forms, the plurality of images for self-calibration may be used every time an imaging device is turned on. Other variations are contemplated. Also, it will be understood that while the images used should be in display order, the images used for the calibration need not necessarily be consecutive. Images may be skipped due to image quality issues and sufficiency for calibration (referred to as ROI validity) as explained in detail below.

Process 900 may include "generate, by the imaging device, device-specific PDAF calibration data comprising refining PDAF calibration data by using the plurality of images" 906. As explained in detail below for the mapping of phase shift to lens offset to form a conversion factor, this operation may comprise iterations that include moving the lens by using the initial (golden) calibration data to an iteration lens position, and capturing the image once the lens stops moving. This is repeated, whether or not PDAF or another AF technique is used, such as contrast, and until an iteration is performed that establishes a focus lens position. The difference between the iteration lens position and the focus lens position is used to determine a focus iteration lens offset for each or individual iterations. The focus iteration lens offset and iteration phase shift that is a result of the iteration lens position (whether or not the iteration phase shift is actually used to form the lens position for a next iteration) is used to compute a local iteration conversion factor (or conversion) thereby mapping the iteration phase shift to the focus lens offset. This is repeated for multiple iterations so that a conversion factor is formed for each or individual iterations. When the same sufficiently or similar conversion is formed from the multiple iterations, the generated conversion is the conversion for a round of iterations, where a round is performed to determine a successful focus upon an object in a scene being captured by the imaging device. This process then may be repeated multiple rounds, each with a plurality of the iterations, and where each round may establish its own conversion factor from its iterations. A final conversion factor may be selected from the multiple round conversion factors or may be some combination of the round conversion factors such as an average. This final conversion factor then may be used to adjust or replace the golden sample conversion. This process also may be performed for each individual ROI so that a conversion factor for each ROI is saved for subsequent autofocus operations to capture images. By one approach, only those ROIs with a sufficiently high reliability value as described herein, and sufficiently low change (or slow or unmoving) image data from image to image are included in the computation.

Alternatively or additionally for shading, this operation may include determining (or refining) a left and right shading value for each ROI. This is calculated by dividing the average left shading value of the left PDAF sensor pixels in the ROI by the average shading value of the regular image sensor pixels in the ROI. For a PDAF-MS system, this is the average shading value of the non-PDAF sensor pixels. For the PDAF-DP system, this is the average of shading values of all the sensor pixels in the ROI. This also could be limited to only those PDAF and non-PDAF sensor pixels providing the same color (chroma) values such as all green for PDAF-MS, or one shading value for each color (or certain color(s)) in PDAF-PD. Each time an iteration is performed, a new average is calculated for an ROI including the average shading values of the prior iterations with that same ROI. By one form, only those ROI that are sufficiently flat and sufficiently bright are used to compute an average shading value so that ROIs on some iterations or frames may be skipped. This is repeated until all ROIs are calibrated, where an individual ROI is considered calibrated when the ROI has some predetermined number of iteration (or frame) shading average contributions to the final shading value of the ROI. The details are provided below.

Process 900 may include "providing the device-specific PDAF calibration data to be used to obtain, by the imaging device, image data of multiple subsequent images" 908. Thus, the golden sample values including ROI conversion look-up tables (or conversion function values), and shading values of the golden sample may be replaced or adjusted. These values are then used on subsequent images and remain unchanged unless a PDAF self-calibration update is desired.

Figure 10C:
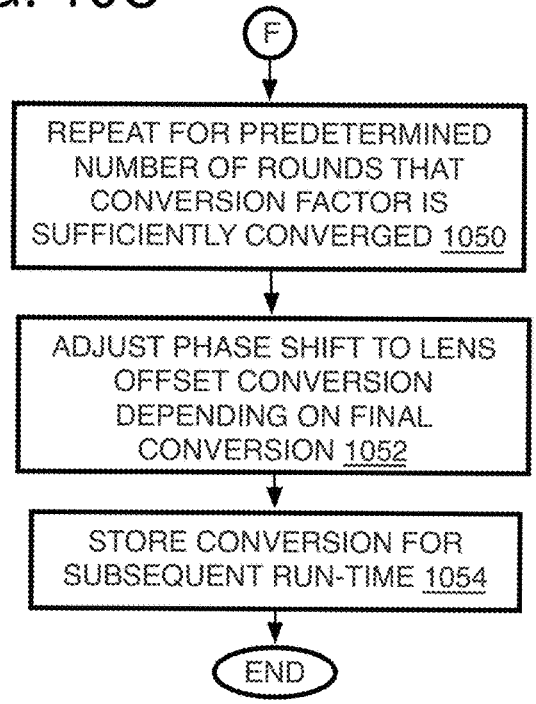

Referring to FIG. 10A-10C, an example process 1000 for self-calibration for phase detection autofocus is arranged in accordance with at least some implementations of the present disclosure, and particularly for mapping PDAF phase shift to lens offset to generate conversion factors. Process 1000 may include one or more operations 1002 to 1054, numbered evenly. By way of non-limiting example, process 1000 may form at least part of a self-calibration phase detection autofocus process for imaging device or system 100, 700, 1200, 1300, and/or 1400 as discussed herein and where relevant.

The PDAF self-calibration processes may be performed when an imaging device is turned on and used to capture images specifically for self-calibration, or could be turned on and used by an end user for the very first time (that is not performed only for calibration purposes for example), or could be implemented each time the imaging device is turned on, or some interval of uses such as every 10 times for example. Other time points for performing the processes could be used as well. Relevant here, the PDAF self-calibration is not limited to a carefully controlled light environment with specified target scenes to capture images that would limit the calibration to the production line.

Process 1000 may include "obtain initial calibration data including initial lens offset conversion value(s)" 1002. As described with imaging devices or systems 100 and 700 above, PDAF sensor pixels sense chroma intensity levels of a certain color, and by one example, in the green spaces of a Bayer filter quad system. In a PDAF-MS system described above, two pixels, which may be in the green (or could be blue or red) spaces of the same Bayer quad are deemed left and right sensor pixels (FIG. 4). The PDAF pixel sensors are not necessarily limited to one color. In the PDAF-DP system, each color sensor pixel space in the Bayer quad has two photodiodes to form left and right phases as described above (FIGS. 5-6). Many alternative spacing and arrangements for the left and right sensor pixels (or dual pixels) are contemplated as already explained above, and each pair of matching left and right sensor pixel provides a left and right R, G, or B value.

Also as mentioned, golden sample data may be loaded onto (or otherwise accessible to) an imaging device and may include a conversion factor (or characteristic or just conversion) providing the mapping from phase shift to lens offset. The conversion factor also will be referred to as a slope of a conversion function as explained below. As described above, the sensor statistics grid may be divided into ROIs or cells where each ROI may be a small area of sensor pixels such as 250×250 pixels. For a PDAF-MS system, at least one pair of PDAF sensor pixels left and right (or other direction designation) are located in each ROI, but often more than 625 pairs, and by one form, the sensors pixels may be evenly spaced from each other in the ROI. For the PDAF-DP system, each or individual whole pixels has left and right photodiodes in the ROI as described above.

Relevant here, the golden sample calibration data may include a conversion for each or individual ROIs. By one form, a look-up table may be provided for each ROI that lists a range of phase shift values (or disparities) on one column and a range of corresponding lens offset values on the other column to avoid computations with a conversion function each time a lens offset is needed, such as that shown below:

TABLE 1

Simplified Example Disparity (Phase-Shift) to Lens Offset Look-up Table

| L vs R disparity | Lens offset (VCM units) |
|---|---|
| −2.4 | 120 |
| −1.2 | 60 |
| 0 | 0 |
| +1.2 | −60 |
| +2.4 | −120 | where −2.4 disparity (or phase shift) and 120 voice coil motor (VCM) lens offset units compensates for a backfocus, and +2.4 disparity and −120 VCM lens offset compensates for a front focus. Zero disparity indicates the correct focus. Such a look-up table may be provided for each ROI on a full sensor. Note that the actual look-up table may have many more rows and disparity values, as well as different values, but that any computed disparity that is not exactly listed on the look-up table may be computed by interpolation.

Alternatively, a conversion factor may be provided for each ROI instead. The conversion factor for table 1 is −50 assuming a linear conversion function such as:

$$LO = (PS)(C) \qquad (1)$$

where LO is the lens offset, PS is the phase shift, and C is the conversion factor of the conversion function. Such a function is graphed on conversion function graph 1060 (FIG. 10D) as golden sample function line 1062, described in detail below. When the conversion is a linear function, the conversion factor may be the slope of the function that is multiplied by the disparity to compute the lens offset. Other functions for the conversion could be used as well. Some options may use an nth degree polynomial (n>=2), spline, or any other 2D curve representation that could be used to map one value into another (phase shift into lens offset). In the example here, the linear function uses a slope and y-crossing at 0 as described (as in chart 1060).

Process 1000 may include "set iteration i=1" 1004, which is an iteration counter used to track iterations for the sample process 1000 described here at least for initially performing image capture iterations toward a correct focus, but may or may not actually be used. A set of the iterations may be considered a round, where the imaging system attempts to obtain a correct focus on an object in an image to be captured by the imaging device. Each iteration includes (1) moving the lens of the imaging device according to a lens offset converted from a phase shift of at least one of the ROIs in the prior iteration, (2) capturing an image, and then (3) computing the new phase shifts based on the light captured for the image. Each iteration may be considered, or processes, a frame, image, or picture in a sequence of such units such as with video recording, but could be a series of still photographs whether captured quickly one after another or alternatively with uniform or non-uniform time periods between images (for very slow or non-moving scenes with fixed camera position for example) or as long as the criteria for a valid ROI sufficient for calibration computations is satisfied as described below.

Process 1000 may include "move lens and capture image according to initial calibration data" 1006. By one form, the first time an end user uses a camera to capture images, it actually may not be the first time the imaging device is used. These PDAF self-calibration processes could be performed by the manufacturer except now careful conditions are not necessary for the sample-specific PDAF calibration. Also, during the production, the imaging device may be turned on and used to capture images for various quality testing and calibration reasons whether to save set the golden sample for PDAF or other calibration settings. By one form, the golden sample phase-shift to lens offset mapping is used for the mapping. During these operations, initial disparities may be measured by the sensor pixels of the imaging device, and may be saved before the imaging device is packaged and sent for sale to end users. By other options, when the disparity phase shift camera actually is used for the first time and no phase-shifts have been previously stored, the imaging device may perform an initial exposure to capture light and measure the left and right PDAF disparities at the PDAF sensor pixels. This may occur if the user presses the actuator part way for example. The left and right phase shifts then can be averaged per ROI and stored.

Once the iteration phase shifts are obtained for the ROIs, one or more ROIs are selected for focus if not selected already as mentioned above where an ROI must be used since it focuses on a selected object in a scene (or image). The iteration phase shifts are converted to lens offset per the golden sample calibrations, and this could be a determination based, at least in part, on the reliability value of the ROIs for subsequent iterations as discussed herein. The lens then may be moved the VCM units indicated by the selected lens offset. The lens is moved based on the phase shift of at least one of the ROIs selected as explained above. The lens also actually may be moved by using PDAF autofocus using the golden sample calibration values, contrast autofocus, or another autofocus technique also which may or may not be at least partly dependent on the reliability value if present. After the lens is moved, an exposure or integration is performed during which the sensor pixels capture light, which is processed and turned into grayscale values as described above.

Process 1000 then may include "obtain statistics for current iteration" 1008, and by one form, the new statistics are obtained only after the lens has stopped moving. While the lens is moving, the sensed light is not attributable to a single lens position, and could include light from varying light ray angles due to the varying lens position, which would provide inaccurate results. Once the lens has stopped moving, the image is captured (light is sensed), and this operation involves analyzing the sensor data to "determine phase shift for individual regions of interest" 1010, and specifically by retrieving the PDAF left and right pixel data pairs (whether MS or DP) which are grayscale values by one example, differencing the data of the pairs, and averaging the difference for individual or each ROI.

By one form, all ROIs of an image are analyzed for PDAF self-calibration. By another form, only those ROIs that are focusing on a particular object in the image are analyzed. In other words, the PDAF self-calibration may be performed for those ROIs that are focused on a certain object in the image when there are multiple objects in an image at multiple depths. In this case, the ROIs that are not focused on the object will not come into focus during the self-calibration. By one form, the object may be a foreground, such as a person, versus a background, or vice-versa, and may have any number of objects, where the ROI are self-calibrated per object. The self-calibration may be repeated for each object distance until all ROIs of the image are calibrated.

Process 1000 may include "determine reliability value for individual regions of interest" 1012, where a reliability or confidence value is determined as part of the statistics and based on an analysis of a curve of accumulated phase differences versus candidate phases shifts for an ROI. The details of one methodology to obtain the reliability values for individual ROIs is summarized above and is disclosed in detail by U.S. Pat. No. 9,338,345, issued May 10, 2016, and titled RELIABILITY MEASUREMENTS FOR PHASE BASED AUTOFOCUS, which is incorporated herein in its entirety. The reliability values are used as explained below.

Once the phase shift statistics and reliability value are obtained for the ROIs of an image, process 1000 may include the query "i>1?" 1014, simply to test whether the first iteration is being handled. When the first iteration is being handled (where i=1), the process jumps to operation 1036 to obtain the next iteration. In that case, process 1000 includes "set next iteration i=i+1" 1036. The next iteration (now the current iteration while the first iteration is now the previous iteration) is then performed, and process 1000 includes "move lens and obtain image data of next available iteration i after lens stops moving" 1038. Thus, the next iteration is of the image captured after the lens stops moving. The images captured while the lens is moving are skipped. Thus, the current and previous images are not necessarily consecutive in a sequence of images being captured, just consecutively available for PDAF self-calibration.

The phase shift (if present) from the previous iteration (which was the first iteration) is used to move the lens to a position that is then used to capture the current frame (for the current iteration). In other words, the phase shift that has been calculated from a frame i ($PS_i$) is used to determine how the lens is to be moved to capture frame i+1 (or i+2 if lens movement is too slow to finish before i+1), where LO=C*$PS_i$. If PDAF was used, and a phase shift is present, which ROI to use to set the lens offset and which AF technique to use on the next iteration(s) (PDAF, contrast, or other AF technique) could be based at least in part on the reliability values of the ROIs as explained above. Continuing with the PDAF example, the previous phase shift becomes the prediction disparity for the current iteration. Once the lens is moved in the current iteration, the current image is captured, and image data is collected as mentioned for the first iteration. Then, the process 1000 loops back to operation 1008 to analyze the current captured image data and collect current statistics for the current iteration including the new ROI iteration phase shift and reliability computations as described for the first iteration.

Now when a subsequent iteration is being processed, the answer to the query at operation 1014 to determine if the current iteration is not the first iteration is yes, and process 1000 continues with "set ROI of iteration at R=1" 1016, where an ROI counter is now used to track the ROIs being validated for calibration in the current iteration. As a preliminary operation to ROI analysis, process 1000 may include "determine validity of ROI R" 1018. Accordingly, process 1000 may include the query "reliability value high?"1020. This may include determining whether the ROI has a sufficiently high reliability value. If not, the ROI may be based on bad data depending on the scene and conditions for capturing an image of the scene that will not result in an accurate phase shift for the ROI for the reasons provided above with the description of the reliability generation unit 716 on device 700 (FIG. 7). The threshold may be predetermined and may be set by heuristics. This threshold may or may not be the same threshold used to determine whether PDAF or contrast autofocus is to be applied, which ROI to use for the lens offset, or used to make other autofocus determinations based on the reliability of the ROI. The setting of the threshold may depend on the algorithm details of the reliability calculation, and experimental results to set the threshold performed until the calibration becomes sufficient. If the reliability is [0%, 100%], the threshold could be e.g. 95% by one example.

As another validity test, process 1000 may include the query "ROI between i and i−1 sufficiently close image data?"1022. This tests whether the image data of ROI R in two PDAF self-calibration images from two consecutive PDAF self-calibration iterations has changed substantially in grayscale, which may indicate a change in chroma as well. Such change could be caused by motion of the objects in the image or motion of the imaging device itself. This may be determined by a SAD, cross-correlation, local motion estimate calculations, gyroscope and/or accelerometer values, or other computation with the sensor pixel values in the ROI R from the current and previous iteration. If there is too much change in pixel image data values (the grayscale values but could be chroma values or both) of an ROI, and from iteration to iteration, then results will not be sufficiently accurate because the phase shifts may change too radically from iteration to iteration to form a basis of comparison of iteration to iteration while computing a conversion factor used over multiple iterations. The threshold here also may be determined by heuristics. By one example, local motion estimation is used to ensure that camera is not moving too much with respect to the target object to be focused on. For example, local motion is less than 10% of the ROI size.

Process 1000 may include "do not include phase shift of ROI R to determine prediction error"1024, if the current ROI R does not pass one of the tests, and is then skipped. Otherwise, process 1000 may include "include phase shift of ROI R to determine prediction error" 1026. In either case for the present example process, before analysis of the ROI or obtaining the next ROI, process 1000 may include the query "last ROI?"1028, to determine if the last ROI of an image was just tested for validity. If not, process 1000 may include "obtain next ROI R=R+1" 1030, and the process loops back to operation 1018 to determine the validity of the next ROI. This is repeated until all of the ROIs that are to be used, at least when the entire image is not being analyzed and only the ROIs focused on an object being analyzed, have been tested for validity by this example. Alternatively, all ROIs of the sensor, and in turn the image, can be tested.

It will be understood that other alternatives exist where each ROI is analyzed for PDAF calibration after being validated, before all other ROIs are being analyzed for validity. The order of operations shown here are for simplicity and convenience purposes and may not be the actual order of operations used (where all ROIs of an image are tested for validity first before iteration conversion analysis).

Continuing with process 1000, once all of the ROIs on an image (or focused on an object in the image) are tested, and those validated ROIs to be calibrated are determined as just discussed, process 1000 then includes "perform run-time autofocus for iteration i" 1032. In other words, as the iterations are being performed thereby forming a sequence of images, autofocus operations are being performed to obtain a correct phase shift and lens offset, and in turn a correct focus. This can be performed by PDAF, contrast autofocus, or some hybrid which may or may not include other focus techniques, and until the correct or optimal focus is determined for one of the iterations. By one example, the iterations may start with PDAF where autofocus is considered to be performed on one iteration. The PDAF may be repeated if an error occurs and the phase shift (or lens offset) is very far from correct focus and until the phase shift is relatively closer to zero. Then contrast autofocus may be used to achieve the proper precise focus and correct focus lens position. Thus, for example, if the results show a relatively large phase shift that is not considered close to a zero phase shift, such as a −2.0 phase shift and 100 VCM lens offset by the example of the Golden sample (Table 1 above), then PDAF may be used again in the next iteration. However, when the phase shift is close to zero (such as +0.5 on the look-up table 1), then contrast autofocus (contrast AF) may be used thereafter.

In conjunction with the run-time autofocus, process 1000 provides "does current iteration have correct focus lens position of individual ROIs" 1034. When PDAF is being used, and when the resulting phase shift from a lens position is zero or sufficiently close to zero in an iteration, that iteration is deemed to provide the correct focus and correct focus lens position. Alternatively, when contrast AF is being used, each iteration may be a contrast AF iteration that determines the total contrast of both PDAF and regular sensor pixels from captured image data for an ROI and in that iteration. The contrast AF seeks the iteration with the maximum contrast and deems that iteration to have the correct focus lens position. The contrast AF may have the lens moved in a predetermined short or fine adjustment distance for each iteration (may be 5 VCM by one possible example) and captures an image and light at each iteration to measure the contrast until a maximum contrast is reached and may perform an overshoot to achieve this. To demonstrate, say the iterations N to N+6 are being analyzed in sequence for contrast AF. The contrast increases for each iteration up to N+5. At N+6, the contrast decreases revealing that the maximum contrast, and correct focus lens position (which may be referred to as $LP_F$), is determined by iteration N+5. This may be performed for individual ROIs that are validated and are being included in the analysis (when the entire image is not being analyzed).

If the current iteration does not generate a correct focus lens position, the next iteration is retrieved by operations 1036 and 1038 already described above, and the process loops back to operation 1008 again to analyze the next iteration. As mentioned, this could be one of the iterations in a multi-iteration run-time autofocus operation, such as contrast AF. In that case, the image data of from PDAF left and right sensor pixels still may be used to generate phase shifts, even though the phase shifts will not be used in a non-PDAF autofocus iteration. This may be performed in order to be able to perform the PDAF self-calibration on the non-PDAF iteration later. In addition, it will be understood that the phase shifts may be generated for each iteration anyway to form statistics used for other non-PDAF autofocus operations or other non-autofocus operations by the imaging device (such as depth map generation for augmented reality purposes.).

The process 1000 may include "determine focus lens offset to be used at previous iterations in round" 1040. Particularly, once the iteration with the correct focus is determined, the focus lens position ($LP_F$) is known. As mentioned, the individual iterations of a round at least until the iteration with the correct focus has a motion of the lens to a lens position, light is sensed by the sensor pixels (or an image is captured), and the phase shift of the iteration is then determined from the captured image data as described above with a phase shift being determined from the left and right sensor pixels (or dual pixels) and for each ROI. The iteration lens position established at each iteration is $LP_i$ and the resulting phase shift from the lens position $LP_i$ is $PS_i$ for each ROI. When the conversion is correct, $PS_i$ multiplied by the conversion C (and at first the golden sample conversion $C_G$) should equal the focus lens offset $LO_F$ to the correct focus position $LP_F$, and as plugged into equation (1) above. In a more generic form, $LO_i=C(PS_i)$, which permits other conversion functions than linear ones that cross the y-axis at 0 (e.g., $LO_i=C*PS_i+y\_crossing$). Otherwise, a look-up table approach could be used as described herein. However, for the iterations other than the iteration with the correct focus lens position, $LP_i$ is not the correct focus lens position. Thus, to determine what the lens offset $LO_i'$ should have been for the iteration i to move the lens from the lens position $LP_i$ to the focus lens position $LP_F$, the difference between the two lens positions corresponds to the lens offset $LO_i$ to obtain the focus lens position at the iteration, which may be recited as follows:

$$d=LP_F-LP_i \quad (2)$$

$$LO_i'=f(d) \quad (3)$$

where d is the distance between the actual lens position at the iteration, and focus lens position that should have been established at the iteration. The distance d is placed into some known function f( ) that converts lens position into lens offset value in VCM units to move the lens the distance d. This is repeated for each iteration in the current round and for each valid ROI being analyzed in the iterations. It should be noted that each iteration can have a different focus lens offset $LO_i'$ because the actual iteration lens position $LP_i$ can be different for each iteration. Within a single iteration, however, the focus lens offset $LO_i'$ is the same for each ROI even though the phase shift $PS_i$ is different from ROI to ROI if the ROIs are at different distances from the camera. The $PS_i$ of the iterations is the resulting PS from the different pairs of PDAF sensor pixels (or dual pixels) in the ROIs based on capturing light with the lens at lens position $LP_i$. The $PS_i$ is now being used to determine what conversion factor $C_i$ should have been applied to obtain the focus lens offset LOi'.

Accordingly, by one form, once the ROI has the corrected focus lens offset $LO_i'$ for each of the iterations in a round, process 1000 then includes "determine iteration focus conversions" 1042. For the example here, the generation of conversions for a single ROI may be generated before analyzing the next ROI. Alternatively, the conversions can be determined for all participating ROIs in a single iteration and then iteration by iteration. Here, once the correct focus lens offset $LO_i'$ is determined for an iteration, the conversion factor to provide the correct mapping of the phase-shift to lens offset can be determined for the individual ROIs at that iteration as follows:

$$C_i=LO_i'/PS_i \quad (4)$$

where $C_i$ is the correct conversion factor or conversion function slope that should have been used to move the lens from the iteration lens position $LP_i$ to the correct focus lens position $LP_F$ by using the correct focus lens offset $LO_i'$ and the phase shift $PS_i$ of an ROI. This is repeated, for each ROI being analyzed, in each of the iterations in a round. The result is a sequence of conversion factors ($C_1, C_2, C_3, \ldots$) for each ROI and from iteration to iteration up to the iteration that provides the actual focus lens position.

Thereafter, process 1000 analyzes the computed conversion factors $C_i$ of the iterations in a round and for an ROI. Particularly, process 1000 then may include "determine self-calibration conversion factors of round have sufficiently converged"1044. If each iteration consistently indicate the same or similar conversion factor $C_i$ should have been used, and in turn, the same or similar adjustment in the mapping look-up table for this ROI, then the adjustment (or conversion factor value) is stored for the round.

Figure 10D:
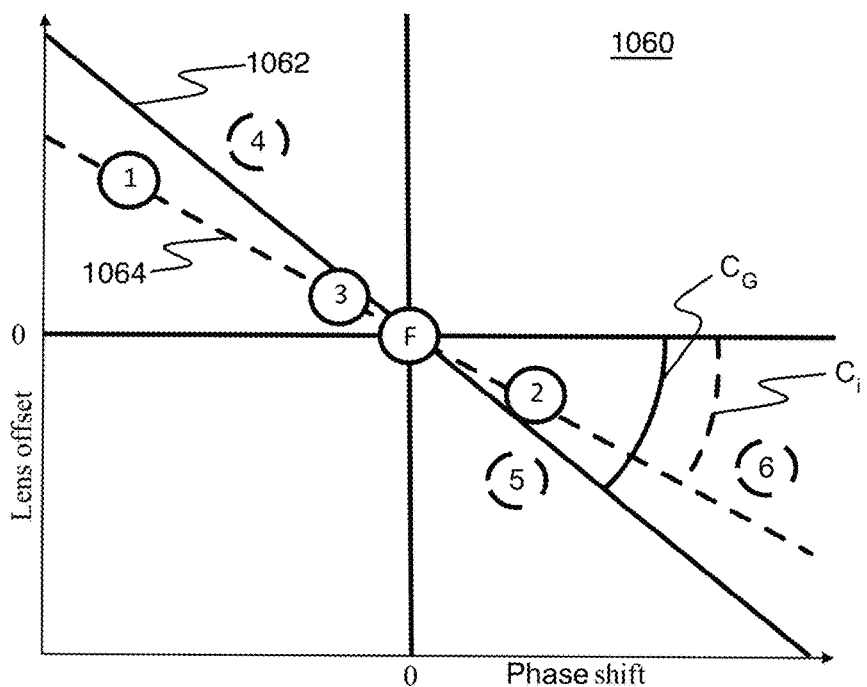
FIG. 10D is a graph of mapping of phase shift to lens offset to assist with explaining PDAF self-calibration according to the implementations described herein.

Referring to FIG. 10D, and in more detail, when the conversion factors $C_i$ of each or some minimum number of individual iterations are the same or very similar, it shows that the iterations follow a linear conversion function, and the conversion factor $C_i$ should have been provided to compute the focus lens offset as the slope of the function. For example, graph 1060 shows the mapping of phase shift to lens offset. The solid line 1062 shows the linear conversion function for the golden sample with conversion factor or slope $C_G$. Now, when the iterations are being analyzed by using the focus lens offset $LO_i'$, by the illustrated example, each iteration establishes the same or a similar conversion factor $C_i$, where for example the differences between $C_1$, $C_2$, and $C_3$ for iterations 1-3 are zero or close to zero. This establishes the linear function shown by dashed line 1064. When such a linear function is established by determining the focus conversion factors are the same or sufficiently similar, the correct focus conversion factor for self-calibration is established for this round of iterations (or in other words, there is sufficient convergence of the conversion factor). In contrast, say conversion factors at the iteration established points 4-6 (shown in dashed line) where there is no similarity in conversion factor. In this case, no convergence is established for the round, and the round is dropped. However, when convergence does exist, for one possible example, assume the correct conversion factor may be −46.67 (forming the values below on look-up table 2), and this conversion factor may be stored. It is not used to adjust the golden sample (table 1) yet. This is performed when a sufficient number of rounds are complete and show that the conversion factor is correct (or sufficiently converged over a number of rounds) as described below.

TABLE 2

Corrected Example Disparity (Phase-Shift) to Lens Offset Look-up Table

| L vs R disparity | Lens offset (VCM units) |
| --- | --- |
| −2.4 | 100 |
| −1.2 | 50 |
| 0 | 0 |
| +1.2 | −50 |
| +2.4 | −100 |

In order to deem the conversion factors sufficiently converged, the conversion factors should be within +/−5% of each other. This may be determined by Heuristics, and the criteria for sufficiently converged can be determined empirically.

Also to establish a converged conversion factor for a single round, an individual ROI should have some minimum number of conversion factors, or in other words, a minimum number of iterations or conversion factor contributions from the iterations in a round. In addition, the starting lens position should be far enough from correct in-focus lens position. This could be a minimum of two iterations or contributions, and lens position distance could be at least 20% of total lens movement range. However, it will be appreciated that individual ROIs may need a different number of iterations than other ROIs to obtain a sufficient number of iteration contributions of conversion factors due to some ROIs being invalid on some iterations according to the validity tests provided above.

To continue, process 1000 then may include the query "conversion factors sufficiently converged for the round" 1046, and for an individual ROI, and repeated for each ROI being analyzed. This may refer to both the number of conversion factor contributions as well as the differences between the conversion factors among the iterations. If one of these are insufficient, the round that did not properly converge is simply dropped and omitted from the analysis, and process 1000 continues with "begin next round" 1048, and process 1000 loops back to operation 1004 to start with a new iteration 1 for the next round. In this case, the golden sample look-up tables (or conversion factors) still will be used to determine the lens offsets for the repeated iterations until a round is established that has a sufficiently converged conversion factor, $C_i$. For PDAF iterations, the lens is still moved according to the golden-based lens offsets as well.

Otherwise, process 1000 may continue with "repeat for predetermined number of rounds that conversion factor is sufficiently converged" 1050 before changing the golden sample PDAF calibration data. As mentioned, a focusing round refers to the whole process of focusing on some object in a scene being captured, and which may include multiple image frames from the camera sensor, multiple AF analysis iterations, and moving the lens multiple times. The focusing rounds may be separately initiated when a user half-presses the shutter button in a digital still camera (DSC) or DSLR, or presses the capture button in a mobile device. During a continuous AF, subsequent focusing rounds after the first round are started when, for example, it is noticed that the ROI has become out of focus, and/or when a scene has changed significantly. A round ends when the scene is stable and the ROI is in focus again. By one form, the calibration is updated only when the focusing round (or the latter stable part of it) has been performed in a stable scene, such as when the camera is not panning and the scene contents are not substantially moving. By one form, determination of a converged final conversion is reached when the same or similar conversion value is generated at some minimum number of rounds, such as 5 rounds, are preformed where each round is required to have a minimum number of iterations for each ROI, such as 2 frames (or iterations or lens positions), as mentioned above.

Process 1000 may include "adjust phase shift to lens offset conversion depending on final conversion" 1052, where the final conversion is the conversion factor determined from the multiple rounds. When the conversion factor of the rounds are not the same, those that are very close, such as within +/−5% may be combined, such as by an average or other combination such as trimmed mean filter, to form the final conversion. By one form, outlier rounds that converge to a conversion factor but one that is significantly different than the conversion factor of other rounds could be left out of the combination as well.

By one form, the final conversion factor from the rounds are used to form a new look-up table stored for individual ROIs. Thus, the golden sample mapping of phase shift to lens offset conversion look-up tables, or data, is then adjusted (including being replaced). For example, table 2 above may replace table 1 for the individual ROIs. By other forms, just the conversion factor is stored for each ROI.

Process 1000 may include "store conversion for subsequent run-time" 1054, where the new PDAF self-calibration data is stored for future autofocus operations, and may not be changed again. Alternatively, as mentioned, the PDAF self-calibration may be updated each time the imaging device is turned on. The PDAF self-calibration could be used at other time as well.

Referring to FIG. 11A-11B, an example process 1100 for self-calibration for phase detection autofocus is arranged in accordance with at least some implementations of the present disclosure, and particularly for determining sensor pixel shading values to generate shading statistics. Process 1100 may include one or more operations 1102 to 1134, numbered evenly. By way of non-limiting example, process 1100 may form at least part of a self-calibration phase detection autofocus process for imaging device or system 100, 700, 1200, 1300, and/or 1400 as discussed herein and where relevant.

Process 1100 may include "obtain initial calibration data including initial average shading values of left and right PDAF pixel pairs and non-PDAF image pixels per ROI" 1102. Particularly, shading statistics may include average shading values for individual ROIs. The ROIs are as defined above as a division or a cell of sensor pixels on a statistics grid where an ROI could be about 250×250 pixels while the statistics grid is divided into 16×12 ROIs forming the statistics grid by one conventional example. The shading refers to average shading values, which may be provided for one or more color channels. Thus, for example, when a PDAF-MS system is being used, the PDAF sensor pixel pairs may be placed in the green locations (the Bayer Gr and Gb locations as shown on sensor 310 (FIG. 4) for example).

For the golden sample statistics, images are captured of a flat field target or object where color and luminance do not vary significantly and by a golden sample imaging device. Then, each PDAF sensor pixel pair may provide a left green value and a right green value. All of the left and right green values (or left and right shading values) in an ROI then may be averaged separately to determine left and right ROI shading values. These left and right shading values are placed on a shading statistics grid stored as part of the golden sample. For PDAF-DP systems where PDAF sensor pixel pairs are provided on all of the color sensors (red, green, and blue), left and right ROI shading values may be provided for each color channel so that each ROI has three sets of left and right ROI shading values (red, green, and blue).

The PDAF self-calibration process for shading statistics may be initiated upon first turning the imaging device on to capture images by an end user (or at the manufacturing plant except without precisely controlled conditions), upon each time the imaging device is turned on, or other variations as with the PDAF self-calibration for the mapping of phase shift to lens offset.

Process 1100 may include "set frame F=1" 1104, where here a frame or iteration counter is set to analyze each frame and aggregate shading values over a number of frames as described below.

To begin the frame analysis, process 1100 may include "move lens and capture image according to initial calibration data" 1106, where an image is first captured using the golden sample including the golden phase shift to lens offset data as well as the golden shading statistics. This creates left and right PDAF sensor pixel values as well as non-PDAF regular sensor pixel values.

Then, process 1100 may include "set ROI of frame F at R=1" 1108, to setup an ROI counter in order to analyze each ROI of a frame, or at least those ROIs that are to be analyzed if not an entire image. By one form, generally speaking, it does not matter whether a specific ROI is focused on a particular object in a scene being captured. Here all ROIs are being analyzed that are considered valid as long as the image data is sufficiently bright and sufficiently flat as defined further below.

Process 1100 may include a query "ROI R calibrated?" 1110, where first there is a check to determine if the current ROI R already is deemed calibrated. If not, the process continues with operation 1126 where process 1100 includes "obtain next ROI R=R+1", and the process loops back to operation 1110.

If the ROI R has not been calibrated yet, process 1100 may include "check validity of ROI" 1111. If valid, the ROI will be included in the analysis. If not, the ROI is skipped until the next frame. This may include checking if "ROI sufficiently flat?" 1112 to determine whether the image data in the ROI has a sufficiently uniform color. By one form, the color component values of the ROI for this test include both PDAF sensor pixel values and non-PDAF sensor pixel values, and of the color pixels of the single channel being analyzed (green, red, or blue) at a time. For PDAF-DP, this may be performed three times each on respective sensors of a particular color when all three channels are being tested. By one form, for PDAF-MS, only the green channel is being tested so only the green sensor values are analyzed for flatness here, but other colors and combination of colors can be used as described above. By another alternative, all values of all sensor pixels in a ROI are included. To perform the test, the color values from the highest to the lowest that are included in the test should not vary by more than 5% in order for the ROI to be valid.

Process 1100 also may include "ROI sufficiently bright?" 1114, where the luminance (or grayscale) values of the ROI may be tested to determine whether the ROI has a sufficiently high brightness. This may be tested in a number of different ways. By one form, all pixel (RGB) values in the ROI must be over a threshold. By another form, an average of all of the pixel values of a ROI must be over a threshold. By yet another form, all pixel values or the average pixel value of only those sensor pixels of the color channel being analyzed (such as all green) are included in the test. The threshold is determined empirically and may be 20% of the maximum value.

Both tests can be checked from the filter response grid (AF-grid) and low resolution representation of the image (RGBS-grid), both of which are part of 3A statistics for many imaging devices. The filter response grid indicates if there are edges or texture present in ROI area, and the low resolution representation of the image indicates the brightness of each color component in the ROI area.

If the ROI does not pass one of the validation tests, the process 1100 loops to operation 1126 again to obtain the next ROI. If the ROI does pass the two validation tests, then process 1100 proceeds with computing a new left and right calibration shading value for the ROI.

Accordingly, process 1100 may include "determine left shading value of ROI R depending on average left shading value in ROI R from frames F so far and regular average shading value in ROI R from frames F so far" 1116. Here, the left shading value of the ROI may be determined by:

$$\text{PDAF\_shading\_}L(\text{ROI}) = \text{Left\_Avg}(\text{ROI})/\text{Regular\_Avg}(\text{ROI}) \qquad (5)$$

where PDAF_shading_L(ROI) is the left shading value of the ROI, Left_Avg(ROI) is the average pixel value of the left PDAF sensor pixels in the same single ROI. Equation (5) is used for each frame, and then averaged as the frames are added. As mentioned, this may be performed per color channel, and could be performed separately for multiple (R, G, B) color channels.

The Regular_Avg(ROI) is the average of the pixel values of all of the non-PDAF sensor pixels of all colors in an ROI by one example. By other alternatives, the Regular_Avg (ROI) is the average of pixel value of only those non-PDAF sensor pixels with the same color channel as the PDAF sensor pixels (such as all green for the PDAF-MS example) for a PDAF-MS system. When multiple color channels can be analyzed separately as with PDAF-DP system, then a Regular_Avg(ROI) may be computed for each color channel. By yet other alternatives, the Regular_Avg(ROI) is the average of all sensor pixels in an ROI whether PDAF or not, and no matter the color. Other variations exist as long as the Regular_Avg(ROI) is the same to determine both left and right shading averages, but provides more accuracy when the Regular_Avg(ROI) is the same color as Left or Right_Avg(ROI).

As mentioned, the left shading value for the ROI (PDAF_shading_L(ROI)) is the average of both the shading values specified in the current ROI as well as the shading values specified in the same ROI in previous frames (where the ROI is valid) up to the present current frame, and as computed as mentioned above. This permits a relatively large sampling to be used to determine a shading value thereby increasing the chances of obtaining a more accurate shading value that is not unduly influenced by outlier shading values or concentrations of shading values.

Process 1100 may include "determine right shading value of ROI R depending on average right shading value in ROI R from frames F so far and regular average shading value in ROI R from frames F so far" 1118. As with the left shading values, the right shading value of an ROI may be determined by:

$$PDAF\_shading\_R(ROI)=Right\_Avg(ROI)/Regular\_Avg(ROI) \qquad (6)$$

where the definitions of these terms are the same as those for the left shading value except labeled right and obtaining right PDAF sensor pixel data. Otherwise, the same operations from the left are applied here for the right. Equation (6) is applied to each frame, and then averaged as the frames are added.

By one alternative form, a trimmed mean filter also may be used that eliminates a number of the lowest and highest shading values (whether left, right, or regular) also to remove outliers. By one form, three highest and lowest values are removed form a shading value population of about at least 20 shading values. The number trimmed could be a fixed number or could be a percentage of the total number of shading values being averaged, or some other variation. Whether or not this option is used, a minimum number of frames may be required to establish a valid left or right ROI shading value to make sure that a sufficient number of frames contribute to the left and right ROI shading value for any one ROI.

Thus, process 1100 then may include the query "sufficient number of frames to mark ROI R as calibrated?" 1120, such that each ROI must have a sufficient number of frames to contribute to the left and right shading value average. By one form this is at least 300 frames (10 seconds at 30 fps if all frames are valid), and is determined empirically. This may be different for a PDAF-MS system where only a few PDAF sensor pixels are placed in each ROI versus a PDAF-PD system where many PDAF dual sensor pixels exist. It should be noted that due to invalid ROIs, some ROIs may be deemed calibrated at later frames than the calibration frames of other ROIs.

When a sufficient number of frames have contributed, process 1100 may include "mark ROI R calibrated" 1122, and the current ROI across some number of frames is now considered calibrated, and will not be analyzed again. Process 1100 then may include the query "max ROI R of frame F?" 1124, to determine whether the analysis of the current frame is complete. If not, process repeats operation 1126 to obtain the next ROI and loop back to operation 1110 to analyze the next ROI. If the last ROI of the frame was analyzed, then process 1100 may include the query "all ROIs calibrated?" 1128, to determine whether self-calibration of shading statistics is complete. If any ROIs still need to be calibrated, then process 1100 may include "set frame F=F+1" 1130, and "obtain shading data of frame F" 1132, where the image data of the next frame is obtained for shading calibration of the ROIs still needed to be calibrated. In this case, the process 1100 then loops back to operation 1108 to analyze the remaining uncalibrated ROIs on the next frame F.

When all of the ROIs of the sensor (or frame or image) are calibrated, process 1100 then may include "store shading values for future run-time use" 1134. Now at this point, the golden sample left and right shading statistics grids are replaced or adjusted to list the new values from the calibrated ROIs. It should be noted that by one example form, the statistics grid lists the left and right shading values to permit the particular application (such as autofocus) to determine any left and right disparities since some applications need to use the separate left and right values.

One example Pseudo code for the operation explained above could be recited as:

```
update_PDAF_shading_calibration( )
{
    if not PDAF shading_calibration_ready( )
    {
        for each ROI as determined by PDAF-Statistics grid
        {
            if ( not already_calibrated(ROI) && valid_for_shading_calibration(ROI) )
            {
                PDAF_shading_L(ROI) = Left_ Avg(ROI) / Regular_Avg(ROI)
                PDAF_shading_R(ROI) = Right_Avg(ROI) / Regular_Avg(ROI)
                Update PDAF shading calibration for this ROI with above calculated values, and increment
the counter associated with this ROI. Once enough frames have contributed in the calibration, and
potential outliers rejected, this ROI can be marked as "calibrated", after which already_calibrated( )
will start returning "true" for this ROI. Once all ROIs are in "calibrated" state,
PDAF_shading_calibration_ready( ) will start returning "true".
            }
        }
    }
}
valid_for_shading_calibration(ROI)
{
    The ROI needs to be (a) flat enough and (b) bright enough. Both can be checked from the filter
response grid (AF-grid) and low resolution representation of the image (RGBS-grid), both of which
are part of typical 3A statistics
}
```

Figure 12:
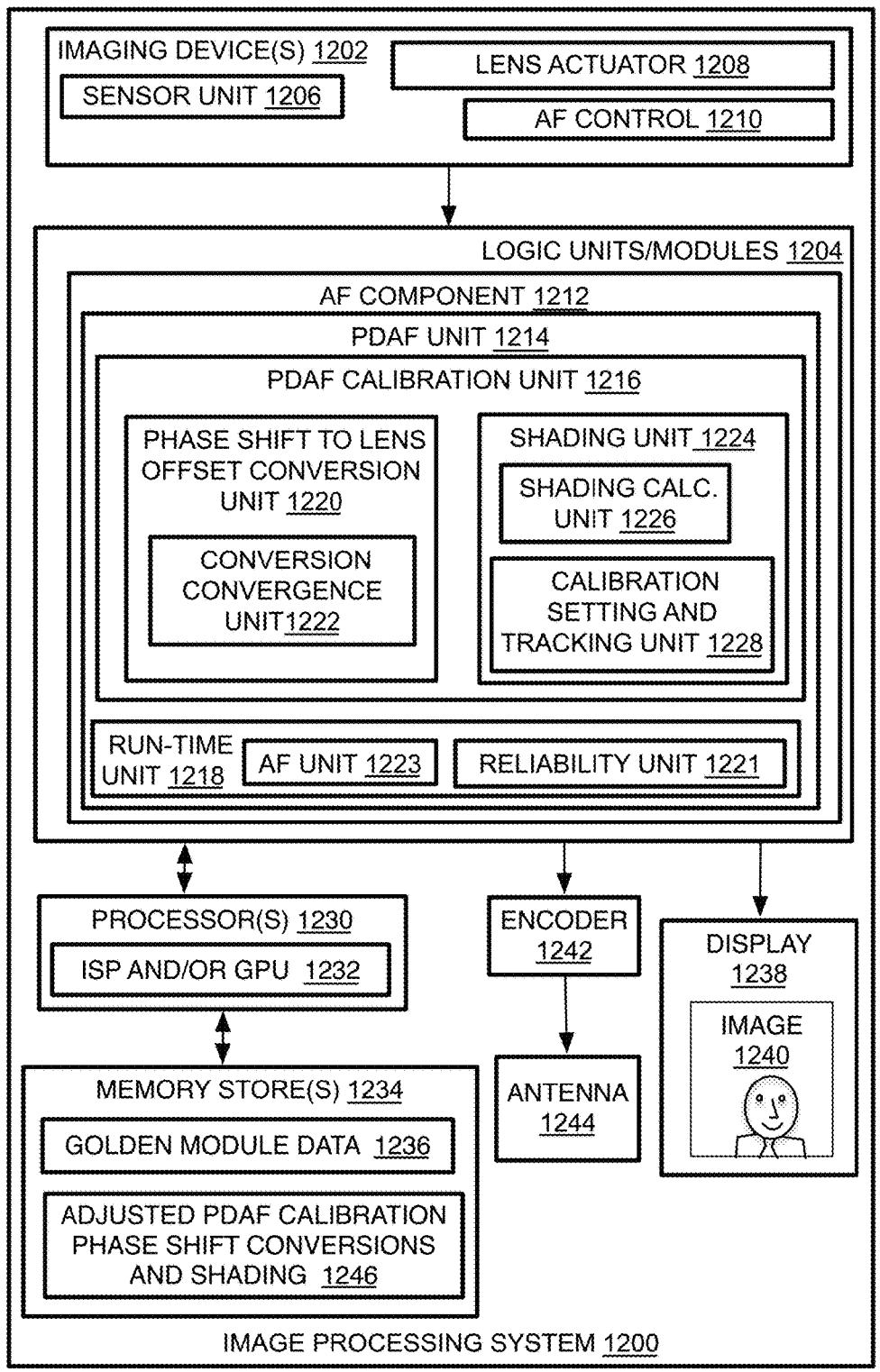
FIG. 12 is an illustrative diagram of an example system for providing self-calibration for phase detection autofocus.

FIG. 12 is an illustrative diagram of an example system 1200 for providing self-calibration autofocus, arranged in accordance with at least some implementations of the present disclosure. In various implementations, the example image processing system 1200 may have an imaging device 1202 to form or receive captured image data. This can be implemented in various ways. Thus, in one form, the image processing system 1200 may be a digital camera or other image capture device, and imaging device 1202, in this case, may be the camera hardware and camera sensor software, module, or component 1206. In other examples, imaging processing system 1200 may have an imaging device 1202 that includes or may be a camera, and logic modules 1204 may communicate remotely with, or otherwise may be communicatively coupled to, the imaging device 1202 for further processing of the image data.

This technology may include a camera such as a digital camera system, a dedicated camera device, or an imaging phone or tablet, whether a still picture or video camera, or device with a preview screen, or some combination of these. Thus, in one form, imaging device 1202 may include camera hardware and optics including one or more sensors as described above as well as auto-focus as described above, zoom, aperture, ND-filter, auto-exposure, flash, and actuator controls. The sensors may provide PDAF sensor pixels in either a PDAF-MS system or a PDAF-PD system. The sensor controls may be part of a sensor module or component 1206 for operating the sensor. The controls of the sensor component 1206 may be part of the imaging device 1202, or may be part of the logical modules 1204 or both. Such sensor component can be used to generate images for a viewfinder, which may include a preview screen, and take still pictures or video. The imaging device 1202 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in addition to or in the alternative to a camera sensor. In some examples, imaging device 1202 may be provided with an eye tracking camera.

The imaging device 1202 also may have a lens actuator 1208 that has a lens and a lens driver or driver logic that receives commands to move the lens and applies an electrical current to move the lens. An autofocus (AF) control 1210 may be provided on the imaging device 1202 as well to collect calibration data from sensors and the lens actuator, and to transmit the data to memories 1204 and/or the AF component 1212.

In the illustrated example, the logic modules 1204 may include an AF component that has a PDAF unit 1214. The PDAF unit has a PDAF calibration unit 1216 and a run-time unit 1218. The PDAF calibration unit 1216 has a phase shift to lens offset conversion unit 1220 which has a conversion convergence unit 1222. The PDAF calibration unit 1216 also may have a shading unit 1224 with a shading calculation unit 1226 and a calibration setting and tracking unit 1228. The run-time unit 1218 may have a reliability unit 1221 and an AF unit that operates many different AF techniques including PDAF and contrast. The operation of these components are described above, and corresponding components to these components, such as in system 700, are clear from the context and names of these components.

The components of logic modules 1204 including the lens PDAF calibration unit 1216 may be operated by, or even entirely or partially located at, processor(s) 1230, and which may include an ISP and/or GPU 1232. The logic modules 1204 may be communicatively coupled to the components of the imaging device 1202 in order to receive raw image data. Optionally, data may be provided by a data stream separate from the raw image data stream. In these cases, it is assumed the logic modules 1204 are considered to be separate from the imaging device. This need not be so, and the logic modules very well may be considered to be part of the imaging device as well.

System 1200 may include one or more processors 1230 and memory stores 1234. In the example of system 1200, memory stores 1234 may store image content such as captured images (or image frames) (e.g., images or phase autofocus images), golden module (or sample) data 1236, adjusted PDAF calibration phase shift conversions and shading data 1246, and/or image related data such as image data generated via an imaging pipeline and/or system or modules such as measurements and weights, focus phase shifts, reliability values, accumulated phase differences, region of interest data, fitted curve data, signal-to-noise ratio data, or other data as discussed herein.

Graphics processing unit 1232 may include any number and type of graphics processing units that may provide the operations as discussed herein. Such operations may be implemented via software or hardware or a combination thereof. For example, graphics processing unit 1232 may include circuitry dedicated to manipulate images obtained from memory stores 1234. Processor(s) 1230 may include any number and type of processing units or modules that may provide control and other high level functions for system 1200 and/or provide any operations as discussed herein. Memory stores 1234 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1234 may be implemented by cache memory. Otherwise, memory 234 may be an EEPROM or device file system. By one form, one or more units of image processing system 1200 and autofocus component 1212 may be implemented via an execution unit (EU) of graphics processing unit 1234. The EU may include, for example, programmable logic or circuitry such as a logic core or cores that may provide a wide array of programmable logic functions. In one form, any of these units may be implemented via dedicated hardware such as fixed function circuitry or the like. Fixed function circuitry may include dedicated logic or circuitry and may provide a set of fixed function entry points that may map to the dedicated logic for a fixed purpose or function.

Various components of the systems described herein may be implemented in software, firmware, and/or hardware and/or any combination thereof. For example, various components of imaging device or system 100, 700, 1200, 1300, or 1400 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the operations of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of imaging device or system 100, 700, 1200, 1300, or 1400, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 13:
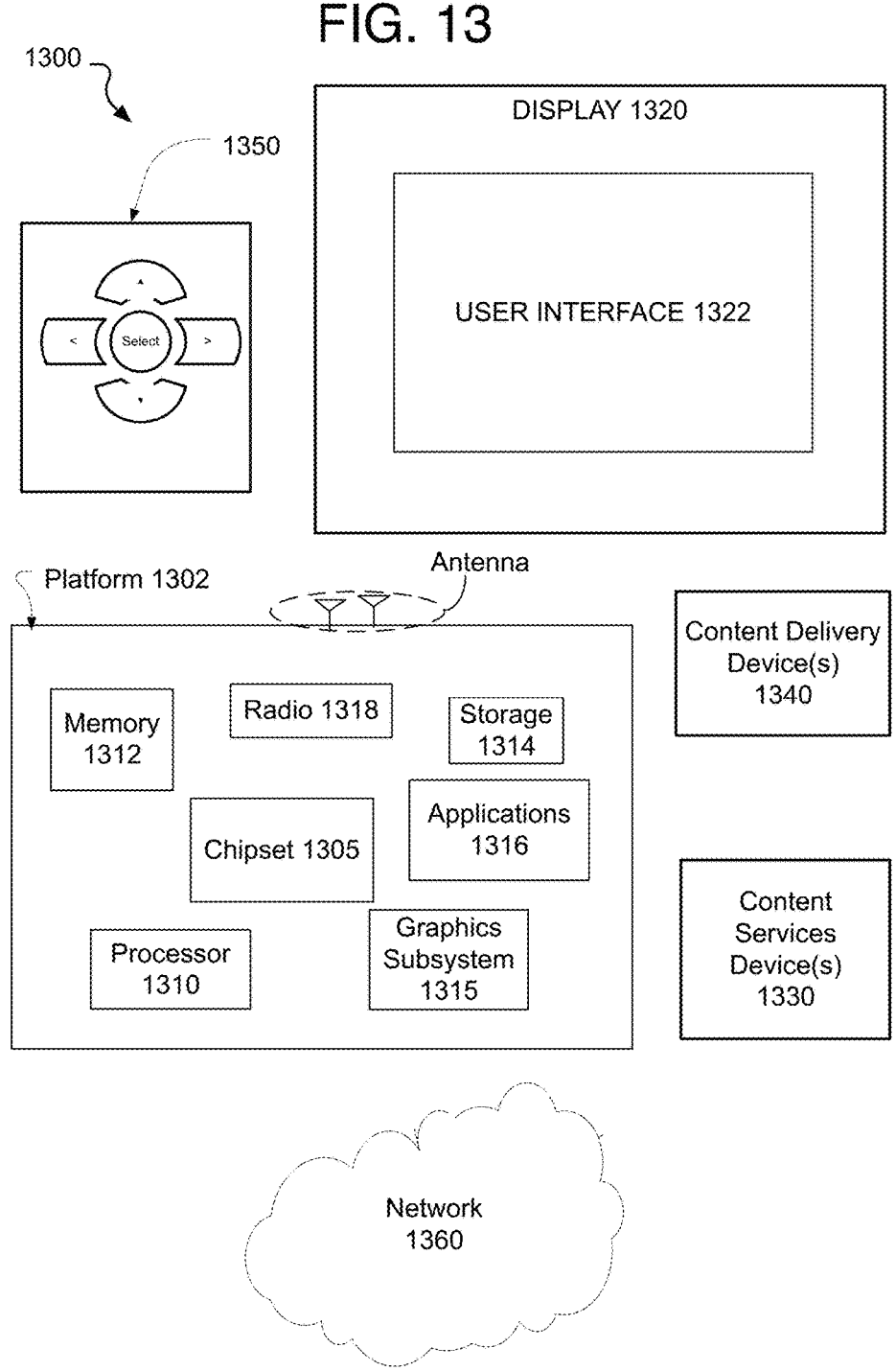
FIG. 13 is an illustrative diagram of an example system.

FIG. 13 is an illustrative diagram of an example system 1300, arranged in accordance with at least some implementations of the present disclosure. In various implementations, system 1300 may be a media system although system 1300 is not limited to this context. For example, system 1300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1300 includes a platform 1302 coupled to a display 1320. Platform 1302 may receive content from a content device such as content services device(s) 1330 or content delivery device(s) 1340 or other similar content sources. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1312, antenna 1313, storage 1314, graphics subsystem 1315, applications 1316 and/or radio 1318. Chipset 1305 may provide intercommunication among processor 1310, memory 1312, storage 1314, graphics subsystem 1315, applications 1316 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, DisplayPort, wireless HDMI, and/or wireless HD compliant techniques. Graphics subsystem 1315 may be integrated into processor 1310 or chipset 1305. In some implementations, graphics subsystem 1315 may be a stand-alone device communicatively coupled to chipset 1305.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In various implementations, content services device(s) 1330 may include a cable television box, personal computer, network, telephone, Internet enabled devices or appliance capable of delivering digital information and/or content, and any other similar device capable of uni-directionally or bi-directionally communicating content between content providers and platform 1302 and/display 1320, via network 1360 or directly. It will be appreciated that the content may be communicated uni-directionally and/or bi-directionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of controller 1350 may be used to interact with user interface 1322, for example. In various embodiments, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1350 may be replicated on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In various embodiments, controller 1350 may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various embodiments, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various embodiments, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 13.

Figure 14:
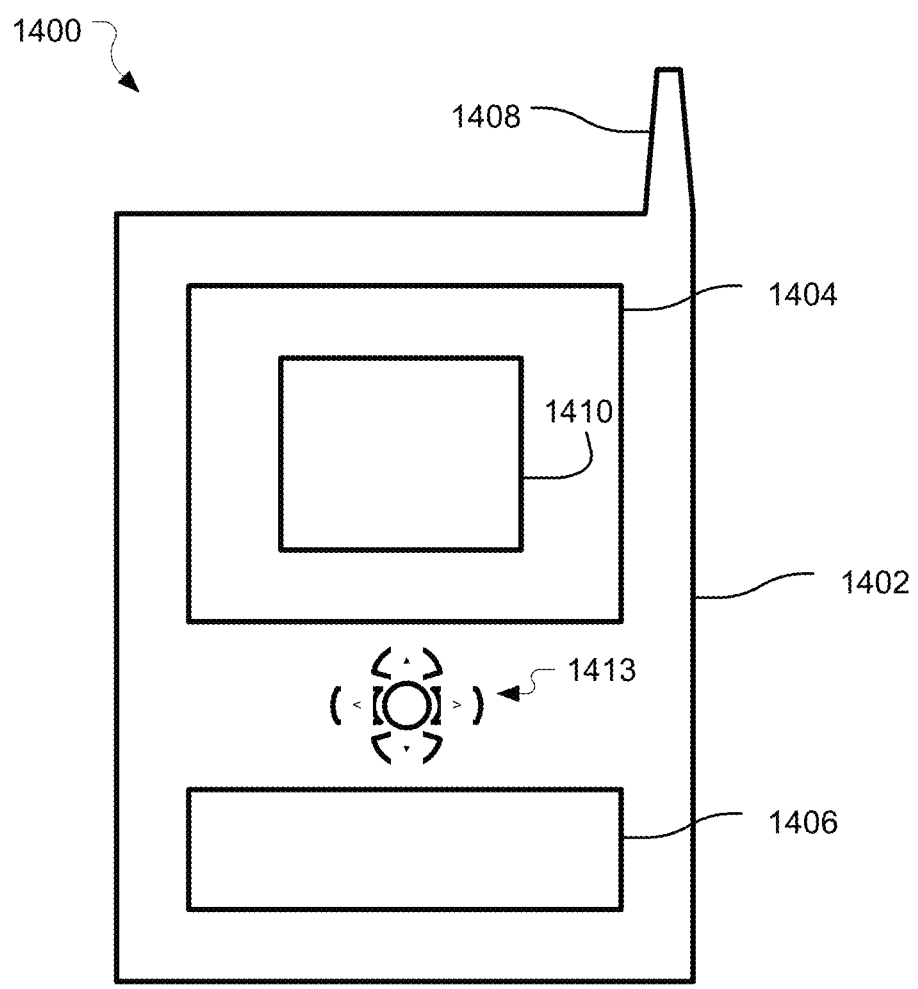
FIG. 14 illustrates an example device, all arranged in accordance with at least some implementations of the present disclosure.

As described above, system 1300 may be embodied in varying physical styles or form factors. FIG. 14 illustrates implementations of a small form factor device 1400 in which system 1200 may be embodied. In various embodiments, for example, device 1400 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, smart tablet or smart television) with one or more autofocus cameras, mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The implementations are not limited in this context.

As shown in FIG. 14, device 1400 may include a housing 1402, a display 1404 including a screen 1410, an input/output (I/O) device 1406, and an antenna 1408. Device 1400 also may include navigation features 1412. Display 1404 may include any suitable display unit for displaying information appropriate for a mobile computing device. I/O device 1406 may include any suitable I/O device for entering information into a mobile computing device. Examples for I/O device 1406 may include an alphanumeric keyboard, a numeric keypad, a touch pad, input keys, buttons, switches, rocker switches, microphones, speakers, voice recognition device and software, and so forth. Information also may be entered into device 1400 by way of microphone (not shown). Such information may be digitized by a voice recognition device (not shown). The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

A computer-implemented method of autofocus self-calibration comprises receiving, at an imaging device, initial phase detection autofocus (PDAF) calibration data with the same values to be provided to multiple imaging devices; capturing, by the imaging device, a plurality of images; generating, by the imaging device, device-specific PDAF calibration data comprising refining PDAF calibration data by using the plurality of images; and providing the device-specific PDAF calibration data to be used to obtain, by the imaging device, image data of multiple subsequent images.

By another implementation, the method may include that wherein the initial and device-specific PDAF calibration data comprises or is based on at least one conversion factor used to convert phase shifts to lens offsets; wherein the imaging device has a sensor having a plurality of sensor pixels providing image data divided into regions of interest, and the method comprising generating a conversion factor for each region of interest; wherein generating device-specific PDAF calibration data comprises using a phase shift of individual regions of interest (ROIs), wherein each ROI having a plurality of sensor pixels comprising at least one PDAF sensor pixel pair forming a phase difference contributing to generating the phase shift of the ROI; the method comprising using a reliability value of individual ROIs to determine whether or not an ROI is to be used to generate the device-specific PDAF calibration data; and wherein the reliability value is based on analysis of a curve formed of candidate phase shift values and accumulated phase differences of the PDAF sensor pixel pairs of the individual ROIs; wherein generating device-specific PDAF calibration data comprises determining whether or not to use an ROI to generate the device-specific PDAF calibration data comprising determining if the image data of an ROI of a current image is sufficiently unchanged from the image data of the same ROI on a last image used to generate PDAF calibration data.

The generating of device-specific PDAF calibration data may be comprising: performing multiple autofocus iterations comprising moving a lens of the image capture device to an iteration lens position for individual iterations; determining a focus lens position on one of the iterations of the multiple autofocus iterations; determining an iteration focus lens offset for the individual iterations and that indicates the lens offset from the iteration lens position to the focus lens position; and using an iteration phase shift established as a result of the iteration lens position and the iteration focus lens offset to generate a phase shift to lens offset conversion factor and of each of the individual iterations prior to the iteration establishing the focus lens offset; replacing or adjusting the initial PDAF calibration data with the conversion factor or PDAF sample-specific calibration data based on the conversion factor when the conversion factor is sufficiently similar or the same on multiple ones of the individual iterations, and the conversion factor is obtained at each of a predetermined number of rounds each round having an iteration establishing the focus lens position and having a plurality of the individual iterations; and providing a conversion factor of each region of interest (ROI) of a sensor of the imaging device, wherein the sensor is formed of groups of sensor pixels each forming one of the ROIs; wherein contrast autofocus is performed during at least some of the individual iterations to obtain the focus lens position; wherein the PDAF sample-specific calibration data is a look-up table of phase shifts and corresponding lens offsets based on the conversion factor; wherein the generating of the sample-specific PDAF calibration adjustment data is performed at at least one of: only once starting at the beginning of a first use of the imaging device by an end-user, and each time the imaging device is turned on; and wherein the PDAF calibration data comprises a set of left and right shading values formed, at least in part, from pairs of PDAF sensor pixels of a sensor of the imaging device.

By yet another implementation, a computer-implemented system for self-calibration for phase detection autofocus, comprising: at least one memory to store image data from pairs of phase detection autofocus (PDAF) sensor pixels of a sensor on an imaging device and other PDAF calibration data; at least one processing unit coupled to the memory; and a phase detection autofocus unit to operate by: receiving, at an imaging device, initial phase detection autofocus (PDAF) calibration data with the same values to be provided to multiple imaging devices; capturing, by the imaging device, a plurality of images; generating, by the imaging device, device-specific PDAF calibration data comprising iteratively refining PDAF calibration data by using the plurality of images; and providing the device-specific PDAF calibration data to be used to obtain, by the imaging device, image data of multiple subsequent images.

By another example, the system includes wherein the imaging device comprises at least one sensor comprising a plurality of pairs of PDAF sensor pixels or pixel sides of divided single sensor pixels, and wherein the PDAF calibration data comprises shading statistics formed of a set of first PDAF shading values and a set of second PDAF shading values, each set being from a different one of the two of individual pairs of the PDAF sensor pixels or pixel sides; wherein the shading values are sufficiently calibrated when a predetermined sufficient number of shading values contribute to generate a final combined shading value over iterations wherein each iteration being associated with one of the plurality of the images and one of the shading values; wherein the at least one sensor comprises a plurality of sensor pixels grouped into regions of interest (ROIs) with at least one pair of PDAF sensor pixels or pixel sides being disposed in individual regions of interest, and wherein the phase detection autofocus unit operates by generating a final combined shading value for individual ROIs; wherein generating device-specific PDAF calibration data is complete when each ROI of the sensor has a final combined shading value; wherein individual final combined shading values are each associated with an average shading value of the shading values in individual ROI and shading values of one of the first and second sets of the PDAF shading values; wherein the final combined shading value of one of the ROIs is an average of an average ROI shading value of a current iteration and average ROI shading value of prior iterations of the same ROI; wherein the final combined shading value is an average of the shading values associated with an ROI and of one of the first or second sets of PDAF shading values divided by the average shading value of sensor pixels in the same ROI including non-PDAF sensor pixels if present; and wherein only those ROIs that are deemed valid are included in the computation to determine a final combined shading value of an ROI, and comprising at least one of: a test to determine if an ROI is sufficiently bright, a test to determine if an ROI has sufficiently flat color, and both.

By one approach, at least one computer readable article comprises a plurality of instructions that in response to being executed on a computing device, cause the computing device to operate by: receiving, at an imaging device, initial phase detection autofocus (PDAF) calibration data with the same values to be provided to multiple imaging devices; capturing, by the imaging device, a plurality of images; generating, by the imaging device, device-specific PDAF calibration data comprising iteratively refining PDAF calibration data by using the plurality of images; and providing the device-specific PDAF calibration data to be used to obtain, by the imaging device, image data of multiple subsequent images.

By another approach, the instructions include that wherein the imaging device comprises at least one sensor comprising a plurality of PDAF sensor pixels arranged into regions of interest (ROIs), and wherein the initial and device-specific PDAF calibration data comprises shading statistics for each ROI and formed of a set of first PDAF shading values and a set of second PDAF shading values, each set being from a different one of pairs of the PDAF sensor pixels or sides of divided single sensor pixels, wherein the shading statistics comprises a shading value formed by dividing the average of one of the sets of shading values in an ROI by the average shading value of all sensor pixels in the ROI including the non-PDAF sensor pixels and of the same color; and wherein the initial and device-specific PDAF calibration data comprises at least one conversion factor used to convert phase shifts to lens offsets, and for each ROI.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of autofocus self-calibration comprising:
    receiving, at an imaging device, initial phase detection autofocus (PDAF) calibration data with the same values to be provided to multiple imaging devices;
    capturing, by the imaging device, a plurality of images;
    generating, by the imaging device, device-specific PDAF calibration data comprising refining PDAF calibration data by using the plurality of images; and
    providing the device-specific PDAF calibration data to be used to obtain, by the imaging device, image data of multiple subsequent images.

2. The method of claim 1 wherein the initial and device-specific PDAF calibration data comprises or is based on at least one conversion factor used to convert phase shifts to lens offsets.

3. The method of claim 2 wherein the imaging device has a sensor having a plurality of sensor pixels providing image data divided into regions of interest, and the method comprising generating a conversion factor for each region of interest.

4. The method of claim 1 wherein generating device-specific PDAF calibration data comprises using a phase shift of individual regions of interest (ROIs), wherein each ROI having a plurality of sensor pixels comprising at least one PDAF sensor pixel pair forming a phase difference contributing to generating the phase shift of the ROI.

5. The method of claim 4 comprising using a reliability value of individual ROIs to determine whether or not an ROI is to be used to generate the device-specific PDAF calibration data.

6. The method of claim 5 wherein the reliability value is based on analysis of a curve formed of candidate phase shift values and accumulated phase differences of the PDAF sensor pixel pairs of the individual ROIs.

7. The method of claim 1 wherein generating device-specific PDAF calibration data comprises determining whether or not to use an ROI to generate the device-specific PDAF calibration data comprising determining if the image data of an ROI of a current image is sufficiently unchanged from the image data of the same ROI on a last image used to generate PDAF calibration data.

8. The method of claim 1 wherein generating device-specific PDAF calibration data comprising:
    performing multiple autofocus iterations comprising moving a lens of the image capture device to an iteration lens position for individual iterations;
    determining a focus lens position on one of the iterations of the multiple autofocus iterations;
    determining an iteration focus lens offset for the individual iterations and that indicates the lens offset from the iteration lens position to the focus lens position; and
    using an iteration phase shift established as a result of the iteration lens position and the iteration focus lens offset to generate a phase shift to lens offset conversion factor and of each of the individual iterations prior to the iteration establishing the focus lens offset.

9. The method of claim 8 comprising replacing or adjusting the initial PDAF calibration data with the conversion factor or PDAF sample-specific calibration data based on the conversion factor when the conversion factor is sufficiently similar or the same on multiple ones of the individual iterations, and the conversion factor is obtained at each of a predetermined number of rounds each round having an iteration establishing the focus lens position and having a plurality of the individual iterations.

10. The method of claim 9 comprising providing a conversion factor of each region of interest (ROI) of a sensor of the imaging device, wherein the sensor is formed of groups of sensor pixels each forming one of the ROIs.

11. The method of claim 8 wherein contrast autofocus is performed during at least some of the individual iterations to obtain the focus lens position.

12. The method of claim 8 wherein the PDAF sample-specific calibration data is a look-up table of phase shifts and corresponding lens offsets based on the conversion factor.

13. The method of claim 1 wherein the generating of the sample-specific PDAF calibration adjustment data is performed at at least one of:
    only once starting at the beginning of a first use of the imaging device by an end-user, and
    each time the imaging device is turned on.

14. The method of claim 1 wherein the PDAF calibration data comprises a set of left and right shading values formed, at least in part, from pairs of PDAF sensor pixels of a sensor of the imaging device.

15. A system for self-calibration for phase detection autofocus, comprising:
    at least one memory to store image data from pairs of phase detection autofocus (PDAF) sensor pixels of a sensor on an imaging device and other PDAF calibration data;
    at least one processing unit coupled to the memory; and
    a phase detection autofocus unit to operate by:
        receiving, at an imaging device, initial phase detection autofocus (PDAF) calibration data with the same values to be provided to multiple imaging devices;
        capturing, by the imaging device, a plurality of images;
        generating, by the imaging device, device-specific PDAF calibration data comprising iteratively refining PDAF calibration data by using the plurality of images; and
        providing the device-specific PDAF calibration data to be used to obtain, by the imaging device, image data of multiple subsequent images.

16. The system of claim 15, wherein the imaging device comprises at least one sensor comprising a plurality of pairs of PDAF sensor pixels or pixel sides of divided single sensor pixels, and wherein the PDAF calibration data comprises shading statistics formed of a set of first PDAF shading values and a set of second PDAF shading values, each set being from a different one of the two of individual pairs of the PDAF sensor pixels or pixel sides.

17. The system of claim 16, wherein the shading values are sufficiently calibrated when a predetermined sufficient number of shading values contribute to generate a final combined shading value over iterations wherein each iteration being associated with one of the plurality of the images and one of the shading values.

18. The system of claim 17, wherein the at least one sensor comprises a plurality of sensor pixels grouped into regions of interest (ROIs) with at least one pair of PDAF sensor pixels or pixel sides being disposed in individual regions of interest, and wherein the phase detection autofocus unit operates by generating a final combined shading value for individual ROIs.

19. The system of claim 18, wherein generating device-specific PDAF calibration data is complete when each ROI of the sensor has a final combined shading value.

20. The system of claim 18, wherein individual final combined shading values are each associated with an average shading value of the shading values in individual ROI and shading values of one of the first and second sets of the PDAF shading values.

21. The system of claim 20, wherein the final combined shading value of one of the ROIs is an average of an average ROI shading value of a current iteration and average ROI shading value of prior iterations of the same ROI.

22. The system of claim 18 wherein the final combined shading value is an average of the shading values associated with an ROI and of one of the first or second sets of PDAF shading values divided by the average shading value of sensor pixels in the same ROI including non-PDAF sensor pixels if present.

23. The system of claim 18 wherein only those ROIs that are deemed valid are included in the computation to determine a final combined shading value of an ROI, and comprising at least one of:
a test to determine if an ROI is sufficiently bright,
a test to determine if an ROI has sufficiently flat color, and
both.

24. At least one non-transitory machine readable medium comprising a plurality of instructions that in response to being executed on an imaging device, cause the imaging device to be operated by: receiving, at an imaging device, initial phase detection autofocus (PDAF) calibration data with the same values to be provided to multiple imaging devices; capturing, by the imaging device, a plurality of images; generating, by the imaging device, device-specific PDAF calibration data comprising iteratively refining PDAF calibration data by using the plurality of images; and providing the device-specific PDAF calibration data to be used to obtain, by the imaging device, image data of multiple subsequent images.

25. The machine readable medium of claim 24, wherein the imaging device comprises at least one sensor comprising a plurality of PDAF sensor pixels arranged into regions of interest (ROIs), and wherein the initial and device-specific PDAF calibration data comprises shading statistics for each ROI and formed of a set of first PDAF shading values and a set of second PDAF shading values, each set being from a different one of pairs of the PDAF sensor pixels or sides of divided single sensor pixels, wherein the shading statistics comprises a shading value formed by dividing the average of one of the sets of shading values in an ROI by the average shading value of all sensor pixels in the ROI including the non-PDAF sensor pixels and of the same color; and wherein the initial and device-specific PDAF calibration data comprises at least one conversion factor used to convert phase shifts to lens offsets, and for each ROI.

* * * * *